US009538167B2

United States Patent
Welch et al.

(10) Patent No.: US 9,538,167 B2
(45) Date of Patent: Jan. 3, 2017

(54) METHODS, SYSTEMS, AND COMPUTER READABLE MEDIA FOR SHADER-LAMPS BASED PHYSICAL AVATARS OF REAL AND VIRTUAL PEOPLE

(75) Inventors: Gregory Francis Welch, Heathrow, FL (US); Henry Fuchs, Chapel Hill, NC (US); Peter Lincoln, Chapel Hill, NC (US); Andrew Nashel, Chapel Hill, NC (US); Andrei State, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 671 days.

(21) Appl. No.: 13/254,837

(22) PCT Filed: Mar. 8, 2010

(86) PCT No.: PCT/US2010/026534
§ 371 (c)(1),
(2), (4) Date: Oct. 24, 2011

(87) PCT Pub. No.: WO2010/102288
PCT Pub. Date: Sep. 10, 2010

(65) Prior Publication Data
US 2012/0038739 A1 Feb. 16, 2012

Related U.S. Application Data

(60) Provisional application No. 61/158,250, filed on Mar. 6, 2009.

(51) Int. Cl.
*G06T 15/00* (2011.01)
*H04N 13/04* (2006.01)
*G06T 15/04* (2011.01)

(52) U.S. Cl.
CPC .......... *H04N 13/0488* (2013.01); *G06T 15/04* (2013.01)

(58) Field of Classification Search
CPC ................ H04N 13/0488; G06T 15/04; G06F 17/30864; G06F 3/017
(Continued)

(56) References Cited

U.S. PATENT DOCUMENTS 1,653,180 A 12/1927 Jalbert
3,973,840 A 8/1976 Jacobs et al.
(Continued)

FOREIGN PATENT DOCUMENTS

JP 06-110131 4/1994
WO WO 2007/008489 A2 1/2007
(Continued)

OTHER PUBLICATIONS

Jebara, Tony, Kenneth Russell, and Alex Pentland. "Mixtures of eigenfeatures for real-time structure from texture." Computer Vision, 1998. Sixth International Conference on. IEEE, 1998.*
(Continued)

*Primary Examiner* — Peter Hoang
(74) *Attorney, Agent, or Firm* — Jenkins, Wilson, Taylor & Hunt, P.A.

(57) ABSTRACT

Methods, systems, and computer readable media for shader lamps-based avatars of real and virtual people are disclosed. According to one method, shader lamps-based avatars of real and virtual objects are displayed on physical target objects. The method includes obtaining visual information of a source object and generating at least a first data set of pixels representing a texture image of the source object. At least one of a size, shape, position, and orientation of a 3D physical target object are determined. A set of coordinate data associated with various locations on the surface of the
(Continued)

target object are also determined. The visual information is mapped to the physical target object. Mapping includes defining a relationship between the first and second sets of data, wherein each element of the first set is related to each element of the second set. The mapped visual information is displayed on the physical target object using a display module, such as one or more projectors located at various positions around the target object.

26 Claims, 9 Drawing Sheets

(58) Field of Classification Search
USPC .............................. 353/28; 345/419; 348/14.6
See application file for complete search history.

(56) References Cited

U.S. PATENT DOCUMENTS

| | | | |
|---|---|---|---|
| 4,076,398 A | 2/1978 | Galbraith | |
| 4,104,625 A | 8/1978 | Bristow et al. | |
| 4,978,216 A | 12/1990 | Liljegren et al. | |
| 5,221,937 A | 6/1993 | Machtig | |
| 5,465,175 A | 11/1995 | Woodgate et al. | |
| 5,502,457 A | 3/1996 | Sakai et al. | |
| 6,283,598 B1 | 9/2001 | Inami et al. | |
| 6,467,908 B1 | 10/2002 | Mines et al. | |
| 6,504,546 B1* | 1/2003 | Cosatto | G06T 13/40 345/473 |
| 6,806,898 B1* | 10/2004 | Toyama et al. | 348/14.16 |
| 6,970,289 B1 | 11/2005 | Auerbach et al. | |
| 7,068,274 B2 | 6/2006 | Welch et al. | |
| 7,095,422 B2* | 8/2006 | Shouji | 345/629 |
| 7,212,664 B2* | 5/2007 | Lee et al. | 382/154 |
| 7,292,269 B2* | 11/2007 | Raskar et al. | 348/207.99 |
| 2002/0015037 A1 | 2/2002 | Moore et al. | |
| 2005/0017924 A1 | 1/2005 | Utt et al. | |
| 2005/0162511 A1 | 7/2005 | Jackson | |
| 2008/0117231 A1 | 5/2008 | Kimpe | |
| 2010/0007665 A1* | 1/2010 | Smith | G06T 13/40 345/473 |
| 2010/0159434 A1* | 6/2010 | Lampotang et al. | 434/365 |
| 2011/0234581 A1* | 9/2011 | Eikelis | G06K 9/00228 345/419 |
| 2012/0093369 A1 | 4/2012 | Ryu | |
| 2015/0178973 A1 | 6/2015 | Welch et al. | |
| 2016/0323553 A1 | 11/2016 | Fuchs et al. | |

FOREIGN PATENT DOCUMENTS

| | | |
|---|---|---|
| WO | WO 2008/112165 A1 | 9/2008 |
| WO | WO 2008/112212 A1 | 9/2008 |
| WO | WO 2013/173724 A1 | 12/2013 |
| WO | WO 2015/070258 A1 | 5/2015 |

OTHER PUBLICATIONS

Notification of Transmittal of the International Search Report and the Written Opinion of the International Searching Authority, or the Declaration for International Patent Application No. PCT/US2010026534 (Oct. 22, 2010).

Notification Concerning Transmittal of International Preliminary Report on Patentability (Chapter I of the Patent Cooperation Treaty) for International Patent Application No. PCT/US2010026534 (Sep. 15, 2011).

Ahlberg et al., "Face tracking for model-based coding and face animation," International Journal of Imaging Systems and Technology, 13(1):8-22 (2003).

AIST, "Successful development of a robot with appearance and performance similar to humans," http://www.aist.go.jp/aist e/latest research/2009/ 20090513/20090513.html (May 2009).

Allen, "Hardware Design Optimization for Human Motion Tracking Systems," Ph.D. dissertation, The University of North Carolina at Chapel Hill, Department of Computer Science, Chapel Hill, NC, USA, pp. 1-100 (Nov. 2007) (Part 1 of 2).

Allen, "Hardware Design Optimization for Human Motion Tracking Systems," Ph.D. dissertation, The University of North Carolina at Chapel Hill, Department of Computer Science, Chapel Hill, NC, USA, pp. 101-190 (Nov. 2007) (Part 2 of 2).

Allen et al., "A general method for comparing the expected performance of tracking and motion capture systems," In VRST '05: Proceedings of the ACM symposium on Virtual reality software and technology, pp. 201-210, Monterey, CA, USA, ACM Press, New Yorks, NY, USA (Nov. 2005).

Allen et al., "Tracking: Beyond 15 minutes of thought: Siggraph 2001 course 11," In Computer Graphics, Annual Conference on Computer Graphics & Interactive Techniques. ACM Press, Addison-Wesley, Los Angeles, CA, USA (Aug. 12-17), siggraph 2001 coursepack edition, (2001).

Androutsellis-Theotokis et al., "A survey of peer-to-peer content distribution technologies," ACM Comput. Surv., 36(4):335-371 (2004).

Azuma et al., "Tracking in unprepared environments for augmented reality system," Computers & Graphics, 23(6):787-793 (1999).

Azuma, et al., "Making augmented reality work outdoors requires hybrid tracking," In First International Workshop on Augmented Reality, pp. 219-224, San Francisco, CA, USA (1998).

Azuma et al., "Space-resection by collinearity: Mathematics behind the optical ceiling head-tracker," Technical Report 91-048, University of North Carolina at Chapel Hill (Nov. 1991).

Bandyopadhyay et al., "Dynamic shader lamps: Painting on real objects," In Proc. IEEE and ACM international Symposium on Augmented Reality (ISAR '01), pp. 207-216, New York, NY, USA, IEEE Computer Society (Oct. 2001).

Biocca et al., "Visual touch in virtual environments: An exploratory study of presence, multimodal interfaces, and cross-modal sensory illusions," Presense: Teleoper. Virtual Environ., 10(3):247-265 (2001).

Bishop, "The Self-Tracker: A Smart Optical Sensor on Silicon," Ph.d dissertation, University of North Carlina at Chapel Hill, 1984. by Gary Bishop. ill. ; 29 cm. Thesis (Ph.D.) University of North Carolina at Chapel Hill (1984).

DeAndrea, AskART, http://www.askart.com/askart/d/john louis de andrea/john louis de andrea.aspx (May 2009).

Epstein, "My date with a robot," ScientificAmericanMind, pp. 68-73 (Jun./Jul. 2006).

Foxlin et al., "Weartrack: a self-referenced head and hand tracker for wearable computers and portable vr," Wearable Computers, 2000. The Fourth International Symposium on, pp. 155-162 (2000).

Fretzagias et al., "Cooperative location-sensing for wireless networks," In PerCom '04: Proceedings of the Second IEEE International Conference on Pervasive Computing and Communications (PerCom'04), p. 121, Washington, DC, USA, IEEE Computer Society (2004).

Garau et al., "The impact of avatar realism and eye gaze control on perceived quality of communication in a shared immersive virtual environment," In CHI '03: Proceedings of the SIGCHI conference on Human factors in computing 529-536, New York, NY, USA, ACM (Apr. 5-10, 2003).

Garau et al., "The impact of eye gaze on communication using humanoid avatars," In CHI '01: Proceedings of the SIGCHI conference on Human factors in computing systems, pp. 309-316, New York, NY, USA, ACM (2001).

Gleicher, "Retargeting motion to new characters," In SIGGRAPH '98: Proceedings of the 25th annual conference on Computer graphics and interactive techniques, pp. 33-42, New York, NY, USA, ACM (1998).

Hendrix et al., "Presence within virtual environments as a function of visual display parameters," Presence: Teleoperators and virtual environments, 5(3):274-289 (1996).

Honda Motor Co., Ltd. "Honda Develops Intelligence Technologies Enabling Multiple ASIMO Robots to Work Together in Coordination," Corporate News Release (Dec. 11, 2007).

(56) References Cited

OTHER PUBLICATIONS

Huang et al., "Visual face tracking and its application to 3d model-based video coding," In Picture Coding Symposium, pp. 57-60 (2001).
Ishiguro, "Intelligent Robotics Laboratory," Osaka University. http://www. is.sys.es.osaka-u.ac.jp/research/index.en.html (May 2009).
Jarmasz et al., "Object-based attention and cognitive tunneling," Journal of Experimental Psychology Applied, 11(1):3-12 (Mar. 2005).
Johnson et al. "A distributed cooperative framework for continuous multi-projector pose estimation," Proceedings of IEEE Virtual Reality 2009 (Mar. 14-18 2009).
Jones et al., "Achieving eye contact in a one-to-many 3d video teleconferencing system," In SIGGRAPH '09: ACM SIGGRAPH 2009 papers, pp. 1-8, New York, NY, USA, ACM (2009).
Jones et al., "Rendering for an interactive 360° light field display," In SIGGRAPH '07: ACM SIGGRAPH 2007 papers, vol. 26, pp. 40-1-40-10, New York, NY, USA, ACM (2007).
"Various face shape expression robot," http://www.takanishi. mech.waseda.ac.jp/top/research/docomo/index.htm (Aug. 2009).
Lincoln et al., "Multi-view lenticular display for group teleconferencing," Immerscom (2009).
Looxis GmbH, "FaceWorx," http://www.looxis.com/en/k75.Downloads Bits-and-Bytes-to-download.htm (Feb. 2009).
Mizell et al., "Immersive virtual reality vs. flat-screen visualization: A measurable advantage," (Submitted for publication. 2003).
Mori, "The Uncanny Valley," Energy, 7(4), pp. 33-35 (1970).
Murray et al., "An assessment of eye-gaze potential within immersive virtual environments," ACM Trans. Multimedia Comput. Commun. Appl., 3(4):1-17 (2007).
Nguyen et al., "Multiview: improving trust in group video conferencing through spatial faithfulness," In CHI '07: Proceedings of the SIGCHI conference on Human factors in computing systems, pp. 1465-1474, New York, NY, USA, ACM (2007).
Nguyen et al., "Multiview: spatially faithful group videoconferencing," In CHI '05: Proceedings of the SIGCHI conference on Human factors in computing systems, pp. 799-808, New York, NY, USA, ACM (2005).
Pausch et al., "A user study comparing head-mounted and stationary displays," In Proceedings of IEEE Symposium on Research Frontiers in Virtual Reality, pp. 41-45, IEEE Press (1993).
Phillips, "On the right track a unique optical tracking system gives users greater freedom to explore virtual worlds," Computer Graphics World, pp. 16-18 (Apr. 2000).
Popovic et al., "Physically based motion transformation," In SIGGRAPH '99: Proceedings of the 26th annual conference on Computer graphics and interactive techniques, pp. 11-20, New York, NY, USA, ACM Press/Addison-Wesley Publishing Co. (1999).
Raskar et al., "Shader lamps: Animating real objects with image-based illumination," In Eurographics Work- shop on Rendering (Apr. 2000).
Raskar et al., "Table-top spatially-augmented reality: Bringing physical models to life with projected imagery," In IWAR '99: Proceedings of the 2nd IEEE and ACM International Workshop on Augmented Reality, p. 64, Washington, DC, USA, IEEE Computer Society (1999).
Schreer et al., "3DPresence—A System Concept for Multi-User and Multi-Party Immersive 3D Videoconferencing," pp. 1-8. CVMP 2008 (Nov. 2008).
Seeing Machines. faceAPI. http://www.seeingmachines.com/product/ faceapi/ (May 2009).
Shin et al., "Computer puppetry: An importance-based approach," ACM Trans. Graph., 20(2):67-94 (2001).
Snow, "Charting Presence in Virtual Environments and Its Effects on Performance," PhDthesis, Virginia Polytechnic Institute and State University (Dec. 1996).
Tachi http://projects.tachilab.org/telesar2/ (May 2009).

Tachi et al., "Mutual telexistence system using retro-reflective projection technology," International Journal of Humanoid Robotics, 1(1):45-64 (2004).
Thomas et al., "Visual displays and cognitive tunneling: Frames of reference effects on spatial judgements and change detection," In Proceedings of the 45th Annual Meeting of the Human Factors and Ergonomics Society, Santa Monica, CA, Human Factors & EroonomicsSociety (2001).
Vallidis, "Whisper: A Spread Spectrum Approach to Occlusion in Acoustic Tracking," Ph.d., University of North Carolina at Chapel Hill (2002).
Vertegaal et al., "Explaining effects of eye gaze on mediated group conversations: amount or synchronization," In CSCW '02: Proceedings of the 2002 ACM conference on Computer supported cooperative work, pp. 41{48, New York, NY, USA, ACM (2002).
Vlasic et al., "Practical motion capture in everyday surroundings," In SIGGRAPH '07: ACM SIGGRAPH 2007 papers, p. 35, New York, NY, USA, ACM (2007).
Vlasic et al., "Face transfer with multilinear models," ACM Trans. Graph., 24(3), pp. 426-433 (2005).
Ward et al., "A demonstrated optical tracker with scalable work area for head-mounted display systems," In Symposium on Interactive 3D Graphics, pp. 43-52, Cambridge, MA USA, ACM Press, Addison-Wesley (1992).
Welch et al., "Motion tracking: No silver bullet, but a respectable arsenal," IEEE Computer Graphics Applications, 22(6), pp. 24-38 (2002).
Welch et al., "High-performance wide-area optical tracking: The hiball tracking system," Presence: Teleoperators and Virtual Environments, 10(1), pp. 1-21 (2001).
Welch et al., "The hiball tracker: High-performance wide-area tracking for virtual and augmented environments," In Proceedings of the ACM Symposium on Virtual Reality Software and Technology, pp. 1-11. ACM SIGGRAPH, Addison-Wesley, University College London, London, United Kingdom (Dec. 20-23, 1999).
Welch et al., "Scaat: Incremental tracking with incomplete information," In Turner Whitted, editor, Computer Graphics, Annual Conference on Computer Graphics & Interactive Techniques, pp. 333-344. ACM Press, Addison-Wesley, Los Angeles, CA, USA (Aug. 3-8), siggraph 97 conference proceedings edition (1997).
Welch, "SCAAT: Incremental Tracking with Incomplete Information," Ph.d. dissertation, University of North Carolina at Chapel Hill, 1996. by Gregory FrancisWelch. ill. ; 29 cm. Thesis (Ph. D.) University of North Carolina at Chapel Hill (1996).
Welch, "Hybrid self-tracker: An inertial/optical hybrid three-dimensional tracking system," Technical Report TR95-048, University of North Carolina at Chapel Hill, Department of Computer Science (1995).
Yonezawa et al., "Gaze-communicative behavior of stuffed-toy robot with joint attention and eye contact based on ambient gaze-tracking," In ICMI'07:Proceedings of the 9th international conference on Multimodal interfaces, pp. 140-145, New York, NY, USA, ACM, (2007).
Yotsukura et al., "Hypermask: projecting a talking head onto real object," The Visual Computer, 18(2):111-120 (Apr. 2002).
You et al., "Orientation tracking for outdoor augmented reality registration," IEEE Computer Graphics and Applications, 19(6), pp. 36-42 (Nov./Dec. 1999).
You et al., "Hybrid inertial and vision tracking for augmented reality registration," In IEEE Virtual Reality, pp. 260-267, Houston, TX USA (1999).
Notification of Transmittal of the International Search Report and the Written Opinion of the International Searching Authority, or the Declaration for International Application No. PCT/US2013/041608 (Aug. 22, 2013).
Non-Final Office Action for U.S. Appl. No. 14/401,834 (May 11, 2016).
Notification of Transmittal to the International Search Report and the Written Opinion of the International Searching Authority, or the Declaration for International Application No. PCT/US2014/065258 (Mar. 26, 2015).

(56) References Cited

OTHER PUBLICATIONS

Final Office Action for U.S. Appl. No. 14/401,834 (Oct. 28, 2016).

* cited by examiner

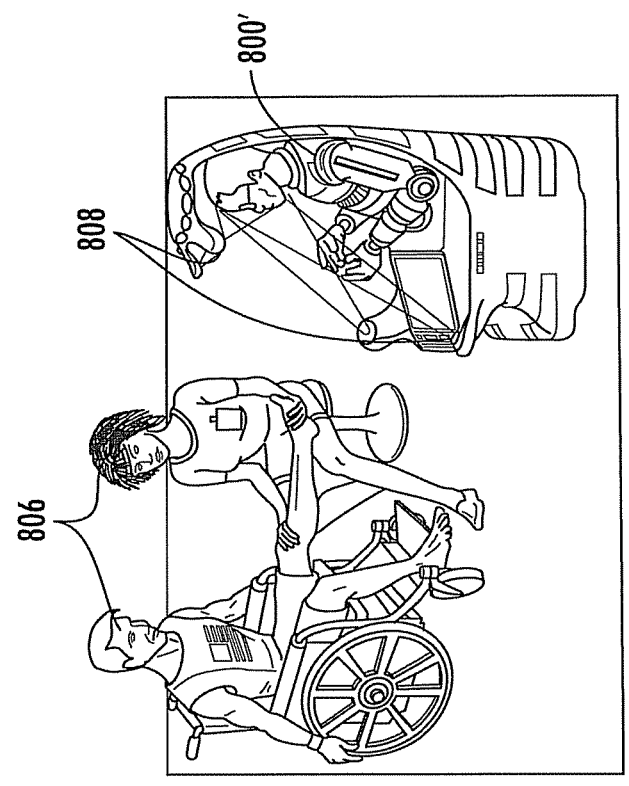
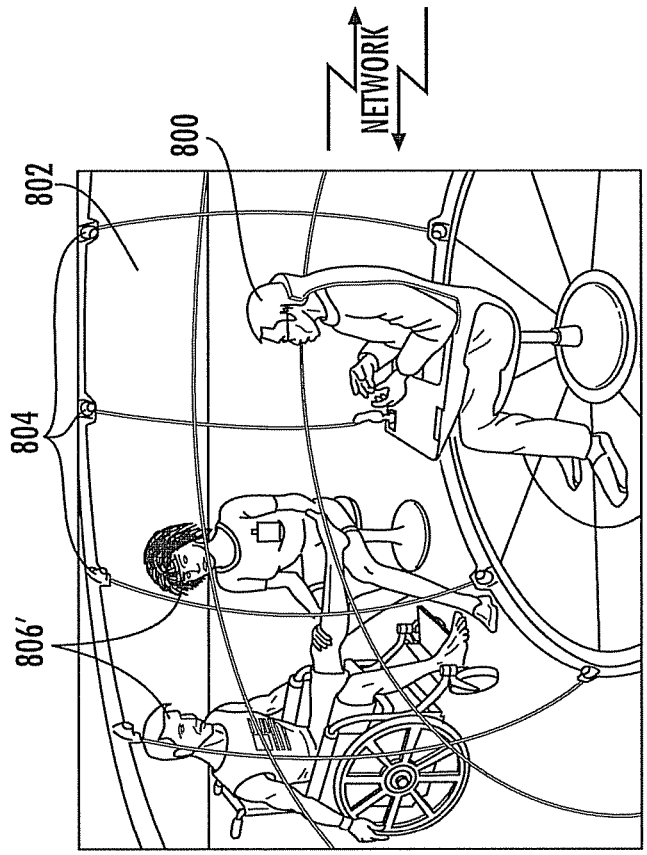
FIG. 8B
FIG. 8A

METHODS, SYSTEMS, AND COMPUTER READABLE MEDIA FOR SHADER-LAMPS BASED PHYSICAL AVATARS OF REAL AND VIRTUAL PEOPLE

PRIORITY CLAIM

This application claims the benefit of U.S. Provisional Patent Application Ser. No. 61/158,250 filed Mar. 6, 2009; the disclosure of which is incorporated herein by reference in its entirety.

GOVERNMENT INTEREST

This presently disclosed subject matter was made with U.S. Government support under Grant No. N00014-08-C-0349 awarded by Office of Naval Research. Thus, the U.S. Government has certain rights in the presently disclosed subject matter.

TECHNICAL FIELD

The subject matter described herein relates to telepresence. More specifically, the subject matter relates to methods, systems, and computer readable media for projecting shader lamps-based avatars of real and virtual objects onto physical target objects.

BACKGROUND

The term "telepresence" generally refers to technologies that enable activities such as remote manipulation, communication, and collaboration. More specifically, telepresence refers to commercial video teleconferencing systems and immersive collaboration between one or more participants located at multiple sites. In a collaborative telepresence system, each user needs some way to perceive remote sites, and in turn be perceived by participants at those sites. The subject matter described herein focuses on how a user is seen by remote participants.

There are numerous approaches to visually simulate the presence of a remote person. The most common is to use 2D video imagery which may include capturing imagery of a subject using a single video camera and displaying the imagery on 2D surface. However, 2D imagery presented in this way lacks a number of spatial and perceptual cues. These cues can be used to identify an intended recipient of a statement, convey interest or attention (or lack thereof), or to direct facial expressions and other non-verbal communication. In order to convey this information to specific individuals, each participant must see the remote person from his or her own viewpoint.

Providing distinct, view-dependent imagery of a person to multiple observers poses several challenges. One approach is to provide separate track and multiplexed views to each observer, such that the remote person appears in one common location. However, approaches involving head-worn displays or stereo glasses are usually unacceptable, given the importance of eye contact between all (local and remote) participants. Another approach is to use multi-view displays. These displays can be realized with various technologies and approaches, however, each has limitations that restrict its utility as illustrated in the following list.

Another approach is to use multi-view displays. These displays can be realized with various technologies and approaches, however each has limitations that restrict its utility, as illustrated in the following list.

"Personal" (per-user) projectors combined with retroreflective surfaces at the locations corresponding to the remote users [16, 17]. Limitations: no stereo; each projector needs to remain physically very close to its observer.

Wide-angle lenticular sheets placed over conventional displays to assign a subset of the display pixels to each observer [13, 21]. Limitations: difficult to separate distinct images; noticeable blurring between views; approach sometimes trades limited range of stereo for a wider range of individual views.

High-speed projectors combined with spinning mirrors used to create 360-degree light field displays [11]. Limitations: small physical size due to spinning mechanism; binary/few colors due to dividing the imagery over 360 degrees; no appropriate image change as viewer moves head vertically or radially.

One example domain to consider is Mixed/Augmented Reality-based live-virtual training for the military. Two-dimensional (2D) digital projectors have been used for presenting humans in these environments, and it is possible to use such projectors for stereo imagery (to give the appearance of 3D shape from 2D imagery). However there are difficulties related to stereo projection. Time/phase/wavelength glasses are possible from a technology standpoint—they could perhaps be incorporated into the goggles worn to protect against Special Effects Small Arms Marking System (SESAMS) rounds. However it is currently not possible (technologically) to generate more than two or three independent images on the same display surface. The result will be that multiple trainees looking at the same virtual role players (for example) from different perspectives would see exactly the same stereo imagery, making it impossible to determine the true direction of gaze (and weapon aiming) of a virtual character.

In fact there are two gaze-related issues with the current 2D technology used to present humans. In situations with multiple trainees for example, if a virtual role player appearing in a room is supposed to be making eye contact with one particular trainee, then when that trainee looks at the image of the virtual role player it should seem as if they are making eye contact. In addition, the other trainees in the room should perceive that the virtual role player is looking at the designated trainee. This second gaze issue requires that each trainee see a different view of the virtual role player. For example, if the designated trainee (the intended gaze target of the virtual role player) has other trainees on his left and right, the left trainee should see the right side of the virtual role player, while the right trainee should see the left side of the virtual role player.

Perhaps the most visible work in the area of telepresence has been in theme park entertainment, which has been making use of projectively illuminated puppets for many years. The early concepts consisted of rigid statue-like devices with external film-based projection. Recent systems include animatronic devices with internal (rear) projection, such as the animatronic Buzz Lightyear that greets guests as they enter the Buzz Lightyear Space Ranger Spin attraction in the Walt Disney World Magic Kingdom.

In the academic realm, shader lamps, introduced by Raskar et al. [20], use projected imagery to illuminate physical objects, dynamically changing their appearance. The authors demonstrated changing surface characteristics such as texture and specular reflectance, as well as dynamic lighting conditions, simulating cast shadows that change with the time of day. The concept was extended to dynamic shader lamps [3], whose projected imagery can be interactively modified, allowing users to paint synthetic surface characteristics on physical objects.

Hypermask [26] is a system that dynamically synthesizes views of a talking, expressive character, based on voice and keypad input from an actor wearing a mask onto which the synthesized views are projected.

Future versions of the technology described herein may benefit from advances in humanoid animatronics (robots) as "display carriers." For example, in addition to the well-known Honda ASIMO robot [6], which looks like a fully suited and helmeted astronaut with child-like proportions, more recent work led by Shuuji Kajita at Japan's National Institute of Advanced Industrial Science and Technology [2] has demonstrated a robot with the proportions and weight of an adult female, capable of human-like gait and equipped with an expressive human-like face. Other researchers have focused on the subtle, continuous body movements that help portray lifelike appearance, on facial movement, on convincing speech delivery, and on response to touch. The work led by Hiroshi Ishiguro [9] at Osaka University's Intelligent Robotics Laboratory stands out, in particular the lifelike Repliee android series [5] and the Geminoid device. They are highly detailed animatronic units equipped with numerous actuators and designed to appear as human-like as possible, also thanks to skin-embedded sensors that induce a realistic response to touch. The Geminoid is a replica of principal investigator Hiroshi Ishiguro himself, complete with facial skin folds, moving eyes, and implanted hair—yet still not at the level of detail of the "hyper-realistic" sculptures and life castings of (sculptor) John De Andrea [4], which induce a tremendous sense of presence despite their rigidity; Geminoid is teleoperated, and can thus take the PI's place in interactions with remote participants. While each of the aforementioned robots take on the appearance of a single synthetic person, the Takanishi Laboratory's WD-2 [12] robot is capable of changing shape in order to produce multiple expressions and identities. The WD-2 also uses rear-projection in order to texture a real user's face onto the robot's display surface. The robot's creators are interested in behavioral issues and plan to investigate topics in human-Geminoid interaction and sense of presence.

When building animatronic avatars, the avatar's range of motion, as well as its acceleration and speed characteristics, will generally differ from a human's. With current state-of-the art in animatronics, they are a subset of human capabilities. Hence one has to map the human motion into the avatar's available capabilities envelope, while striving to maintain the appearance and meaning of gestures and body language, as well as the overall perception of resemblance to the imaged person. Previous work has addressed the issue of motion mapping ("retargeting") as applied to synthetic puppets. Shin et al. [23] describe on-line determination of the importance of measured motion, with the goal of deciding to what extent it should be mapped to the puppet. The authors use an inverse kinematics solver to calculate the retargeted motion.

The TELESAR 2 project led by Susumu Tachi [25, 24] integrates animatronic avatars with the display of a person. The researchers created a roughly humanoid robot equipped with remote manipulators as arms, and retro-reflective surfaces on face and torso, onto which imagery of the person "inhabiting" the robot is projected. In contrast to the subject matter described herein, these robot-mounted display surfaces do not mimic human face or body shapes. Instead, the three-dimensional appearance of the human is recreated through stereoscopic projection.

Accordingly, in light of these difficulties, a need exists for improved methods, systems, and computer readable media for conveying 3D audiovisual information that includes a fuller spectrum of spatial and perceptual cues.

SUMMARY

Methods, systems, and computer readable media for shader lamps-based avatars of real and virtual people are disclosed. According to one method, shader lamps-based avatars of real and virtual objects are displayed on physical target objects. The method includes obtaining visual information of a source object and generating at least a first data set of pixels representing a texture image of the source object. At least one of a size, shape, position, and orientation of a 3D physical target object are determined. A set of coordinate data associated with various locations on the surface of the target object is also determined. The visual information is mapped to the physical target object. Mapping includes defining a relationship between the first and second sets of data, wherein each element of the first set is related to each element of the second set. The mapped visual information is displayed on the physical target object using a display module, such as one or more projectors located at various positions around the physical target object.

A system for projecting shader lamps-based avatars of real and virtual objects onto physical target objects is also disclosed. The system includes an input module for obtaining visual information of a source object, generating at least a first data set of pixels representing a texture image of the source object, determining at least one of a size, shape, position, and orientation of a 3D physical target object, and determining a set of coordinate data associated with the various locations on the surface of the physical target object. A mapping module maps the visual information to the physical target object, where mapping includes defining a relationship between the first and second sets of data and each element of the first set is related to each element in the second set. A display module displays the mapped visual information on the physical target object.

The subject matter described herein for shader lamps-based avatars of real and virtual people may be implemented using a non-transitory computer readable medium to having stored thereon executable instructions that when executed by the processor of a computer control the processor to perform steps. Exemplary computer readable media suitable for implementing the subject matter described herein include non-transitory computer readable media, such as chip memory devices or disk memory devices accessible by a processor, programmable logic devices, and application specific integrated circuits. In addition, a computer readable medium that implements the subject matter described herein may be located on a single computing platform or may be distributed across plural computing platforms.

DEFINITIONS

As used herein, the term "shader lamps" refers to projectors that project captured images of a physical object with its inherit color, texture, and material properties onto a neutral object so that the neutral object will appear as the physical object. For example, a shader lamp projector may be used to project captured imagery of a real human onto an animatronic human or avatar so that the animatronic human or avatar will appear as the human.

As used herein, the terms "shader lamps avatar" (SLA), "shader lamps-based physical avatar," and "avatar" refer to the complete collection of human surrogate parts, and any associated other parts or accessories.

As used herein, the term "surrogate" refers to something that takes the place of another; a substitute. For example, a shader-lamps-based virtual doctor may be a surrogate for a real doctor who is remotely located.

As used herein, the terms "inhabiter" or "user" refer to an entity, person, or user who is the source for audio/visual information, spatial and perceptual cues, etc. that is projected onto an avatar.

As used herein, the terms "virtual surface" and "surrogate surface" refer to one or more physical surfaces of an avatar onto which audiovisual information is projected. For example, a model of an idealized human head made of Styrofoam™ may include multiple virtual surfaces (e.g., left side, right side, and front) onto which video imagery of an inhabiter may be projected.

BRIEF DESCRIPTION OF THE DRAWINGS

The subject matter described herein will now be explained with reference to the accompanying drawings of which:

FIGS. 8A and 8B are illustrations of an exemplary medical application of shader-lamps based physical avatars of real and virtual people according to an embodiment of the subject matter described herein.

DETAILED DESCRIPTION

Figure 1:
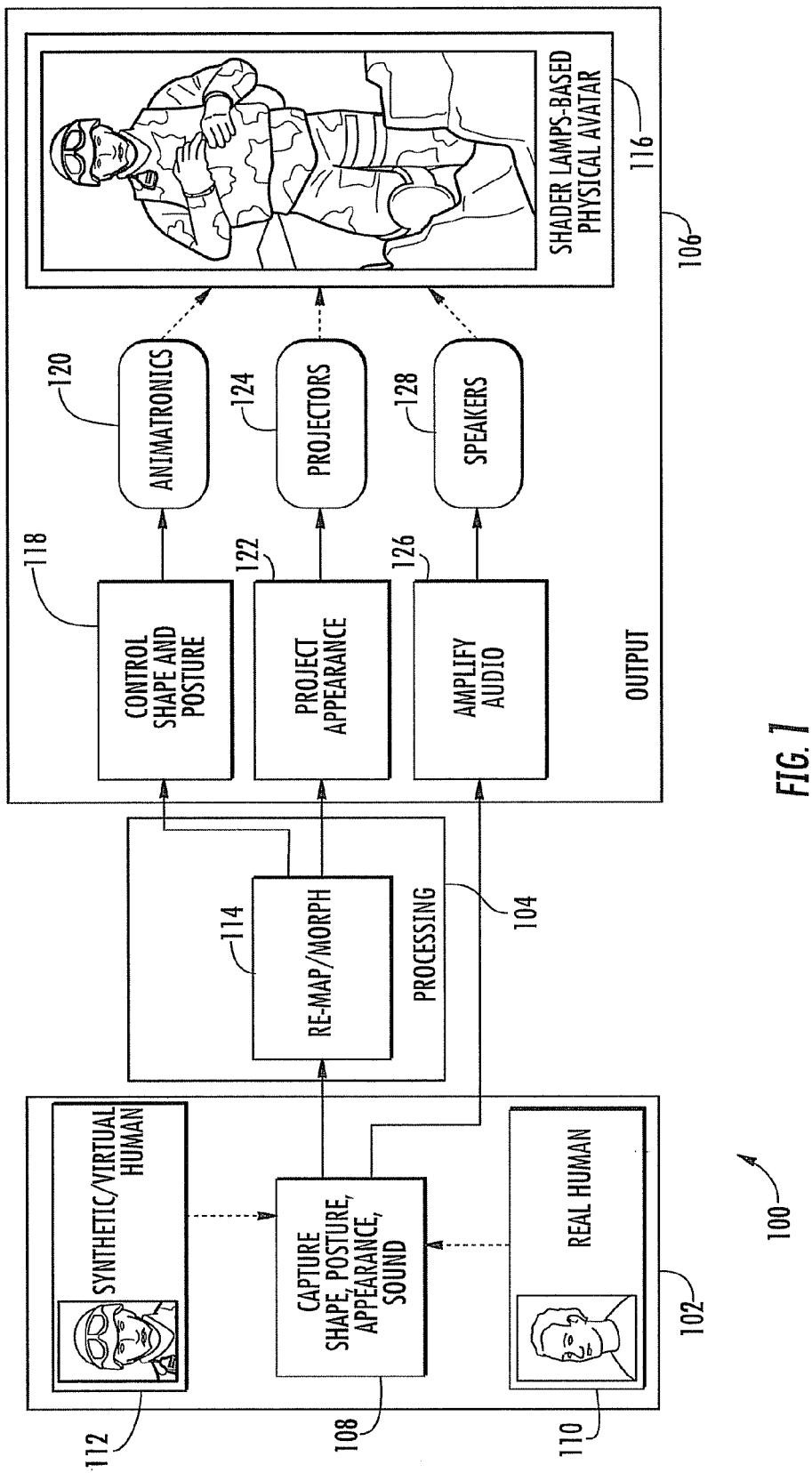
FIG. 1 is a block diagram showing exemplary components of a system for providing shader-lamps based physical avatars of real and virtual people according to an embodiment of the subject matter described herein.

The present subject matter includes an approach for providing robotic avatars of real people, including the use cameras and projectors to capture and map both the dynamic motion and appearance of a real person and project that information onto a humanoid animatronic model, hereinafter referred to as a shader lamps avatar (SLA). As will be described in greater detail below, an exemplary system may include an input source (e.g., a human), a camera, a tracking system, a digital projector, and a life-sized display surface (e.g., a head-shaped or other display surface, which will act as a surrogate for the human body part). As stated above, the complete collection of human surrogate parts and any associated other parts or accessories form the avatar for the human. To convey avatar appearance, live video imagery of the person's actual head or other body parts may be captured, the video imagery may be mathematically reshaped or "warped" to fit the surrogate surfaces, and shader lamps techniques [3, 19, 20] may be used to project the reshaped imagery onto the surrogate surfaces. To convey motion and 6D poses (i.e., 3D position and 3D orientation), the user's head and/or body parts may be tracked, and computer-controlled actuators may be used to update the poses of the surrogate surface(s) accordingly and the matching imagery may be continually re-warped and projected onto the surrogate surface(s). The subject matter described herein may also be scaled to any number of observers without the need to head-track each observer. Using human-shaped surrogate display surfaces helps to provide shape and depth cues understood by viewers. As a result, all observers can view the avatar from their own unique perspectives, and the appearance and shape of the avatar will appear correct (e.g., acceptably human like). This approach also scales to any number of observers, who are not required to be head-tracked.

To provide the human with a view of the scene around the avatar one can also add outward-looking cameras to the avatar (e.g., in or around the head) as will be illustrated and described below, and corresponding displays for the human. Similarly audio can be transmitted using microphones on (or in or near) the avatar/human, and speakers near the human/avatar. (Microphones and speakers associated with both the human and avatar can provide full-duplex audio.)

Other disclosed techniques (and associated exemplary embodiments) include the use of animatronic components such as articulated limbs; dynamic (e.g., expanding/contracting) body parts to reshape the avatar before or during use; the use of a motion platform to provide mobility of the avatar for a remote human user; the use of 2D facial features and 2D image transformation ("warping") to perform the mapping and registration of human to surrogate (avatar); the use of interchangeable surrogate surfaces to accommodate different users; the use of surrogate surfaces that are optimally shaped to minimize perceived error in the avatar appearance as seen by other nearby observers; integration of these methods with a human patient simulator for medical training; projection of appearance from the front or back of the surrogate surfaces (inside or outside the avatar); the use of flexible or shapeable emissive or other surface-based displays to change the appearance of the surrogate surfaces (avatar); and the mixture of dynamic/virtual appearance changes with real materials/appearances (e.g., painted surfaces, real clothing, etc.).

The shader lamps avatar technology described herein may lead to personal 3D telepresence for remote meetings, distance education, medical training or bi-directional telepresence. For example, virtual surrogates for real doctors could move around a remote facility to interact with patients or other medical personnel, both seeing and being seen as if they were really there. Alternatively an avatar could be used for a remote patient, for example allowing distant surgeons to stand around a dynamic physical avatar (mannequin) of a real remote patient on a real surgical table. The hands of the doctors at both ends could be shown on the real/virtual patient to aid in communication—seeing incisions and suturing for example, while being able to directly point to areas of concern, etc. These techniques could also be used in conjunction (integrated) with a robotic human patient simulator to create a human patient simulator that also can change appearance, such as changing skin color as a result of oxygen deprivation. A realistic looking mobile robotic avatar could prove especially valuable to disfigured or immobile individuals (e.g., paraplegic, polytrauma, burn survivors), allowing them to virtually move around a shopping mall for example, interacting with friends and sales people as if they were actually there. They could even be made to appear as they did before the trauma.

The following description includes exemplary embodiments of the subject matter described herein. One exemplary system is composed of two main functions and corresponding channels: the capture and presentation of the user (the inhabiter) of the shader lamps avatar and the capture and presentation of the shader lamps avatar's site.

FIG. 1 is a block diagram showing exemplary components of a system for providing shader-lamps based physical avatars of real and virtual people according to an embodiment of the subject matter described herein. Referring to FIG. 1, system 100 may be divided into input components 102, processing components 104, and output components 106. Components 102-106 will be described in greater detail below.

Stage 1

Input/Capture

Input components 102 may include capture module 108, real source 110, and synthetic source 112. In typical scenarios, audiovisual information, gesture, position, posture, gesture, shape, and orientation data may be captured solely from a real (e.g., human) source. However, it is appreciated that the source of captured data may be either real, synthetic, or a combination thereof.

In one embodiment, the source of captured data may be purely real. For example, real source 110 may include a physical human being. In another embodiment, the type of inhabiter and the specific inhabiter (e.g., specific people), could be dynamically transitioned during use. In yet another embodiment, the source of captured data may be purely synthetic. For example, synthetic source 112 may include a computer-generated 3D model of a human being.

Capture module 108 may obtain visual imagery, audio information, and at least one of a size, shape, position, and orientation of a 3D physical target object from an input source. Some types of information may be determined based solely on captured video imagery or, alternatively, may be determined using input received from additional capture devices. For example, input components 102 may include a 1024×768 ⅓" charge-coupled device (CCD) color camera running at 15 frames per second (FPS) for capturing video imagery. In one example where the source is a real human, the focus, depth of field, and field of view of the camera may be optimized to allow the subject to comfortably move around in a fixed chair. In another embodiment, capture module 108 may include multiple cameras for capturing video imagery of an input source from multiple angles.

In yet another embodiment, capture module 108 may obtain video imagery from synthetic source 112 without the use of a camera. Instead, capture module 108 may obtain video imagery directly from software responsible for generating synthetic source 112. For example, synthetic source 112 may include a virtual character in a virtual world that may be expressed mathematically in terms of a 3D model, texture map, etc. This data may be directly forwarded to capture module 108 in a suitable format understandable by capture module 108.

In one embodiment, at least one of a size, shape, position, and orientation of a 3D physical source object may be obtained from video imagery. For example, during a calibration stage, a starting position and orientation of a user's head may be determined based on an image analysis of predetermined reference points on the user's head (e.g., eyes, mouth, jaw outline, etc.) relative to objects in the background of the image frame (e.g., picture frame, grid, etc.).

In another embodiment, capture module 108 may include a tracking system for tracking movement of the user. One example of a tracking system suitable for tracking the position, location, and/or orientation of an object includes the Optotrak® system produced by Northern Digital Inc. (NDI) of Ontario, Canada. For example, capture module 108 may include a vision-based tracking system, thereby obviating the need for a separate tracker and to allow human motion to be captured without cumbersome targets. Alternatively, trackerless systems may use position-reporting features of pan-tilt units in order to derive the pose of an object.

Capture module 108 may also include a microphone for capturing audio information from source 110. For example, a microphone may be integrated with the video capture device and record sound (e.g., voice data) from human source 110. Alternately, the microphone may be separate from the video capture device and be connected to a computer or other device for storing, synchronizing, caching, amplifying, and/or otherwise processing the captured audio stream.

In another embodiment, audio information may be captured without using a microphone. Similar to capturing visual imagery from a synthetic source without the use of a camera described above, audio information may be directly received from software responsible for creating and maintaining synthetic source 112. For example, a video game executed on a computer may forward an audio stream directly to an audio capture program without playing the sound and subsequently recording it using a microphone. It is appreciated that, similar to capturing visual information from synthetic source 112, capturing audio from synthetic source 112 may more accurately reproduce the audio information of the source because no playback/recording loss or distortion is introduced.

Input components 102 may send the visual imagery, audio information, and size, shape, position, and/or orientation of source object 110/112 to processing components 104 for translating, converting, morphing, mapping, multiplexing and/or de-multiplexing the information into formats suitable for display on surrogate surface(s) of avatar 116. For example, capture module 108 may send visual information data to re-map/morph module 114. Capture module 108 may be connected to re-map/morph module 114 by a network connection, such as a local area network (LAN) (e.g., Ethernet) or a wide area network (WAN) (e.g., the Internet.) Re-map/morph module 114 may construct a 3D model of the source and target objects and map an image texture onto the target object model so as to correctly align with predetermined features on the source object.

Stage 2

Processing

Data received from capture module 108 may be processed before being sent to output stage 106. This processing may include mapping visual information captured from a source object 110 or 112 to a physical target object 116. It is appreciated that the shape of target object 116 may not be known before the mapping. For example, an initial mapping between a first set of coordinate data associated with various locations on the surface of the source object with and target objects may be provided irrespective of the shape of the target object. The shape of the target object may then be determined and the initial mapping may be morphed based on the determined shape of the target object. The morphed data set may then be re-mapped to the target object.

As shown in FIG. 1, some types of data captured by capture module 108 may bypass processing and be sent directly to output components 106. For example, an audio stream may bypass processing stage 104 and be forwarded directly to output stage 106. In other embodiments, audio information may be decoded, converted, synchronized, or otherwise processed at processing stage 104. Audio may also be bidirectionally communicated using a combination of microphones and speakers located on, in, or near source 110/112. Thus, microphones and speakers associated with both the human and avatar can provide full-duplex audio.

Stage 3

Output

Output components 106 may include one or more devices for presenting information produced by re-map/morph module 114 to one or more viewers interacting with avatar 116. For example, output components 106 may include: a control module 118 for physically controlling avatar 116, appearance projection module 122 for displaying visual imagery on avatar 116, and an audio amplification module 126 for playing audio that may be synchronized with the visual imagery and movement of avatar 116. In one embodiment, avatar 116 may include an animatronic head made of Styrofoam™ that serves as the projection surface. Avatar 116 may also be mounted on a pan-tilt unit (PTU) that allows the head to mimic the movements source inhabiters 110 or 112. Additionally, it is appreciated that avatar 116 may include more than a head model. For example, a head model and PTU may be mounted above a dressed torso with fixed arms and legs, onto which imagery may also be projected and which may be controlled animatronically. Control module 118 may physically direct the shape and posture of avatar 116. This may include animatronics 120 such as one or more actuators for lifting, rotating, lowering, pushing, pulling, or squeezing, various physical aspects of avatar 116 including the head, limbs, torso, or fingers.

Other techniques suitable for use with the subject matter described herein may include the use of animatronic components such as articulated limbs; dynamic (e.g., expanding/contracting) body parts to reshape the avatar before or during use; the use of a motion platform to provide mobility of the avatar for a remote human user; the use of 2D facial features and 2D image transformation ("warping") to perform the mapping and registration of human to surrogate (avatar); the use of interchangeable surrogate surfaces to accommodate different users; the use of surrogate surfaces that are optimally shaped to minimize perceived error in the avatar appearance as seen by other nearby observers; integration of these methods with a human patient simulator for medical training; projection of appearance from the front or back of the surrogate surfaces (inside or outside the avatar); the use of flexible or shapeable emissive or other surface-based displays to change the appearance of the surrogate surfaces (avatar); and the mixture of dynamic/virtual appearance changes with real materials/appearances (e.g., painted surfaces, real clothing, etc.).

Appearance projection module 122 may include one or more devices configured to display visual imagery onto avatar 116. Typically, "front" projection methods (i.e., projection onto outside surfaces of avatar 116) may be used. In one embodiment, visual appearance may be projected onto avatar 116 using a single projector. One drawback, however, to single projector embodiments is that imagery may be limited to certain perspectives. For example, high-quality imagery may be limited to the front of the face. Because in-person communications are generally performed face-to-face, it may nevertheless be reasonable to focus visual attention onto this component.

In another embodiment, visual imagery may be projected onto avatar 116 using multiple projectors 124. For example, a first projector may illuminate the left side of avatar 116's head, a second projector may illuminate the right side of avatar 116's head, a third projector may illuminate avatar 116's torso, and so forth. The positioning and arrangement of each projector in multi-projector embodiments may be optimized for the number and position of viewers and/or the environment in which avatar 116 is used.

In other embodiments, "inside" projection methods (i.e., projection onto inside surfaces) may be used for displaying visual imagery onto avatar 116. For example, avatar 116 may include a semi-transparent plastic shell so that one or more projectors may be located inside (or behind) avatar 116 and display video imagery onto the interior surface(s) of avatar 116 such that the video imagery is perceivable to observers of the outer surface of avatar 116.

In addition to projection methods, it is appreciated that other methods for displaying visual imagery onto avatar 116 may be used without departing from the scope of the subject matter described herein. For example, various surface display technologies may be used for displaying visual imagery without the need for projectors. In one embodiment, the surface of avatar 116 may include one or more display screens. The display screens may be curved or uncurved, and may include transmissive (e.g., LCD) and emissive (e.g., PDP) surface display technologies. It is appreciated that other surface display technologies (e.g., flexible organic light emitting diode (OLED) display material) may also be used for displaying visual imagery from the surface of avatar 116 without departing from the scope of the subject matter described herein.

Finally, it is appreciated that the subject matter described herein may be combined with the use of real/physical materials including, but not limited to, painted surfaces, real clothing, and wigs for people, or real/physical items for objects or large scenes in order to provide a more realistic experience for users interacting with avatar 116.

Audio amplification module 126 may include one or more devices for producing sound audible to one or more listeners. For example, speakers 128 may receive a pulse code modulated (PCM) audio stream from capture module 108 and play the audio stream to one or more users interacting with avatar 116. The audio stream may be synced with one or more features of avatar 116, such as synchronizing the playback of words with the lip movement (either real, virtual, or both) of avatar 116.

Figure 2A:
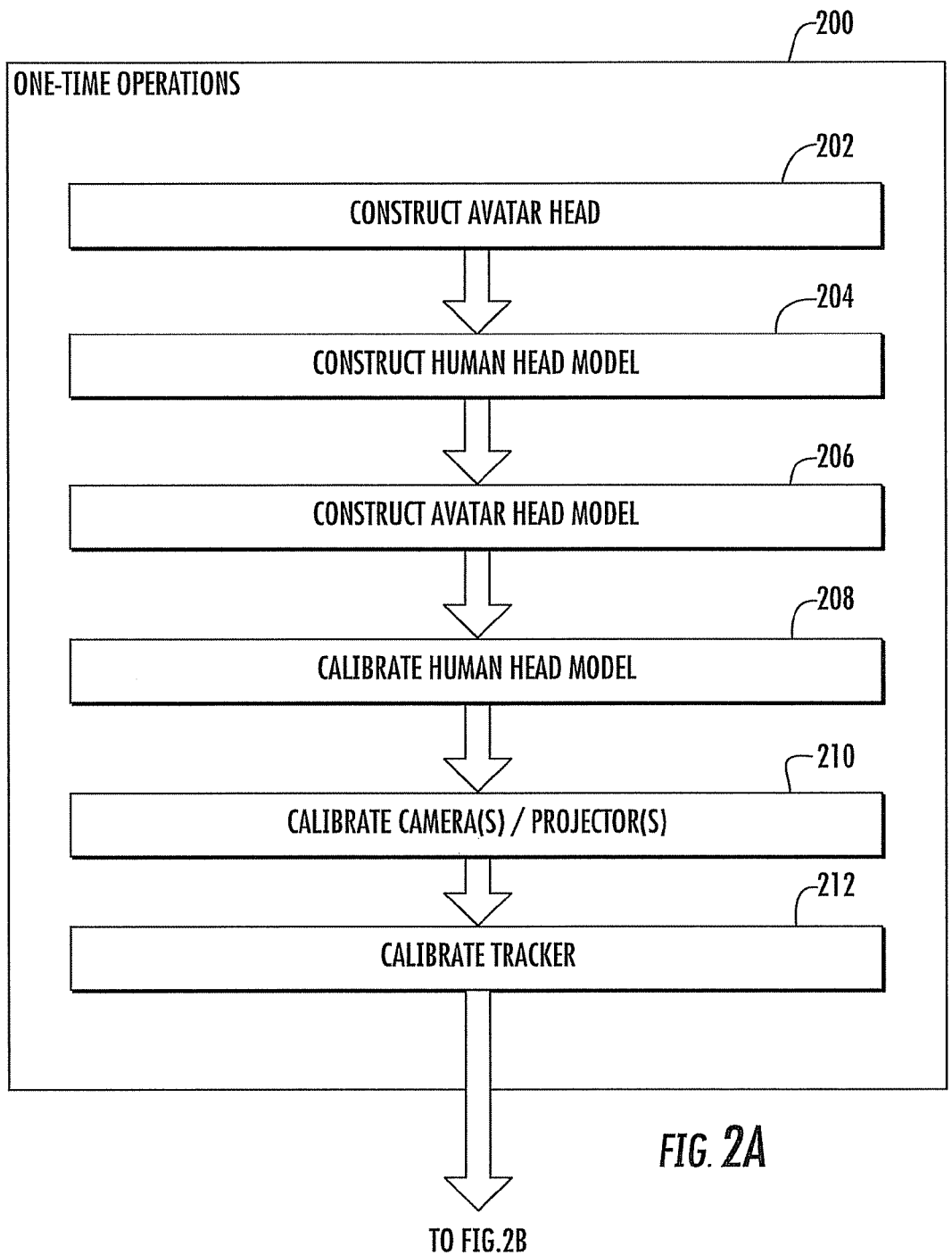
FIGS. 2A and 2B are a flow chart of exemplary steps for projecting shader lamps-based avatars of real and virtual objects onto physical target objects according to an embodiment of the subject matter described herein.
Figure 2B:
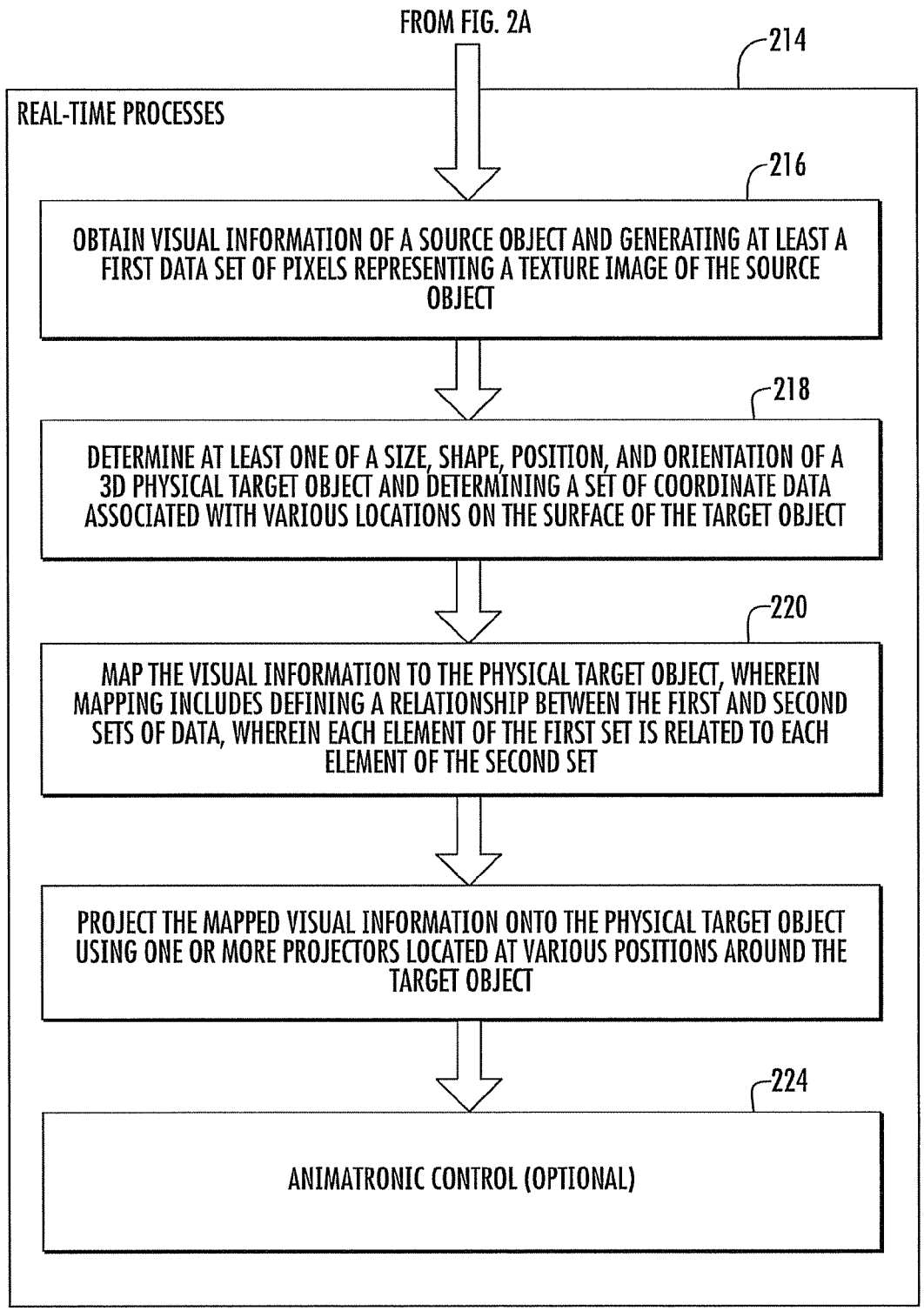

FIGS. 2A and 2B are a flow chart of exemplary processes for projecting shader lamps-based avatars of real and virtual objects onto physical target objects according to an embodiment of the subject matter described herein. Referring to FIG. 2A, one-time operations 200 may include various processes that may be performed in any order, but for sake of simplicity, these steps are generally divided into construction of various entities and subsequent calibration of those entities. For example, in step 202, an avatar head may be constructed. This may include molding, carving, milling, or otherwise creating an object having a desired shape (e.g., head, torso, etc.) In step 204, a model of the source user's head may be created. In the case of a human source, a head model may be created by capturing visual imagery of the user's head from multiple angles and extrapolating a size and shape of the head. The determined size and shape data may be converted into a 3D mesh wireframe model that may be stored and manipulated by a computer, for example, as a set of vertices. Alternatively, if the source object is synthetic, the source object model may be directly received from a software program associated with creating the source object model. In step 206, an avatar head model is constructed. For example, because the human head model and the avatar head model may be topologically equivalent, the avatar head model may be constructed through serially morphing the human head model.

Beginning in step 208, calibration may begin. For example, in step 208, the human head model may be calibrated. Calibration may include, among other things described in greater detail in later sections, finding the relative pose of the head model with respect to a reference coordinate frame. In step 210, the camera(s) and projector(s) may be calibrated. At the capture site, this may include pointing the camera at the source user so that all desired visual imagery may be obtained and ensuring that projectors properly project the scene from the avatar's viewpoint onto one or more screens. At the display site, camera and projector calibration may include pointing one or more cameras away from the avatar so that the inhabiter can see what the avatar "sees" and adjusting one or more projectors in order to properly illuminate surfaces of the avatar. Finally, in step 212, if the system includes a tracker, the tracker may be calibrated. For example, a reference point may be established in order to determine the position and orientation of the user's head relative to the reference point. After completion of one-time operations 200, real-time processes may be performed.

FIG. 2B shows exemplary real-time operations that may occur during operation of the system. Referring to FIG. 2B, real-time processes 214 may generally include: an input/capture stage for receiving various information related to the source object, a processing stage for creation of a model of the object and morphing and mapping the model to fit the avatar, and an output stage for rendering and projecting imagery of the model onto the avatar's surface.

The input stage may include capturing both visual and non-visual information. In step 216, visual information of a source object is obtained and at least a first data set of pixels representing a texture image of the source object is generated. For example, a camera may capture a digital image including a user's face. In step 218, at least one of a size, shape, position, and orientation of a 3D physical target object are determined and a set of coordinate data associated with various locations on the surface of the target object are also determined. For example, a head-tracking apparatus may be attached to the user's head for determining a size, shape, position, and orientation of the user's head. Reference points such as the inside of the user's eyes, the tip of the nose, the corners of the mouth, may be determined either manually or automatically. For example, an operator may observe the captured image and manually mark various reference locations.

During the processing stage, in step 220, visual information is mapped to the physical target object, where mapping includes defining a relationship between the first and second sets of data and each element of the first set is related to each element of the second set. For example, one element in the first data set may correspond to the inside corner of the source object's eye. This element may be linked to an element in the second data set corresponding to the inside corner of the target object's eye.

Finally, during an output stage, in step 222, the mapped visual information is projected onto the physical target object using one or more projectors located at various positions around the target object. For example, the texture video image of the human inhabiter's face may be projected onto the Styrofoam™ head of avatar 116 in such a way that the image of the eyes of the human inhabiter appear correctly located on the avatar's head (e.g., approximately halfway down the face and spaced 6 cm apart). Thus, the facial features of human source 110 may be mapped to corresponding features of avatar 116 by taking advantage of the identical topology of their 3D models so that avatar 116 can present human source 110's eyes, nose, mouth, and ears in structurally appropriate positions.

Because the human's features are texture-mapped to the corresponding locations of the avatar, all observers at the display site can both see a representation of the avatar's user and accurately assess in which direction the user is looking.

It is appreciated that the capture and playback sides of the system may be decoupled. Specifically, the motion of the avatar need not match that of the human user in order to show relevant imagery. Because the texture produced by the input camera is displayed on the avatar via projective texturing of an intermediate 3D model, the position and orientation of the avatar is independent of the human's position and orientation. The image directly projected on the avatar is dependent on the avatar's model and the current tracker position for the pan-tilt unit. Through this decoupling, the motion of the avatar can be disabled or overridden and the facial characteristics of human and avatar will still match to the best degree possible. However, if the relative orientations of human and camera on the one hand, and of avatar and projector on the other hand, are significantly different, the quality of the projective texture may be degraded due to missing visual information. At the capture site, this information may not visible to the camera if the human user looks away from it. At the display site, the avatar surfaces that should be illuminated with a particular texture fragment may not be reachable by the projector if the avatar turns away from the projector. This issue may be resolved with additional cameras and/or projectors that would capture and/or project with better coverage. To provide the user inhabiting the avatar with a sense of the space around the avatar, outward-looking cameras to the avatar (e.g., in or around the head) may be used.

Figure 3:
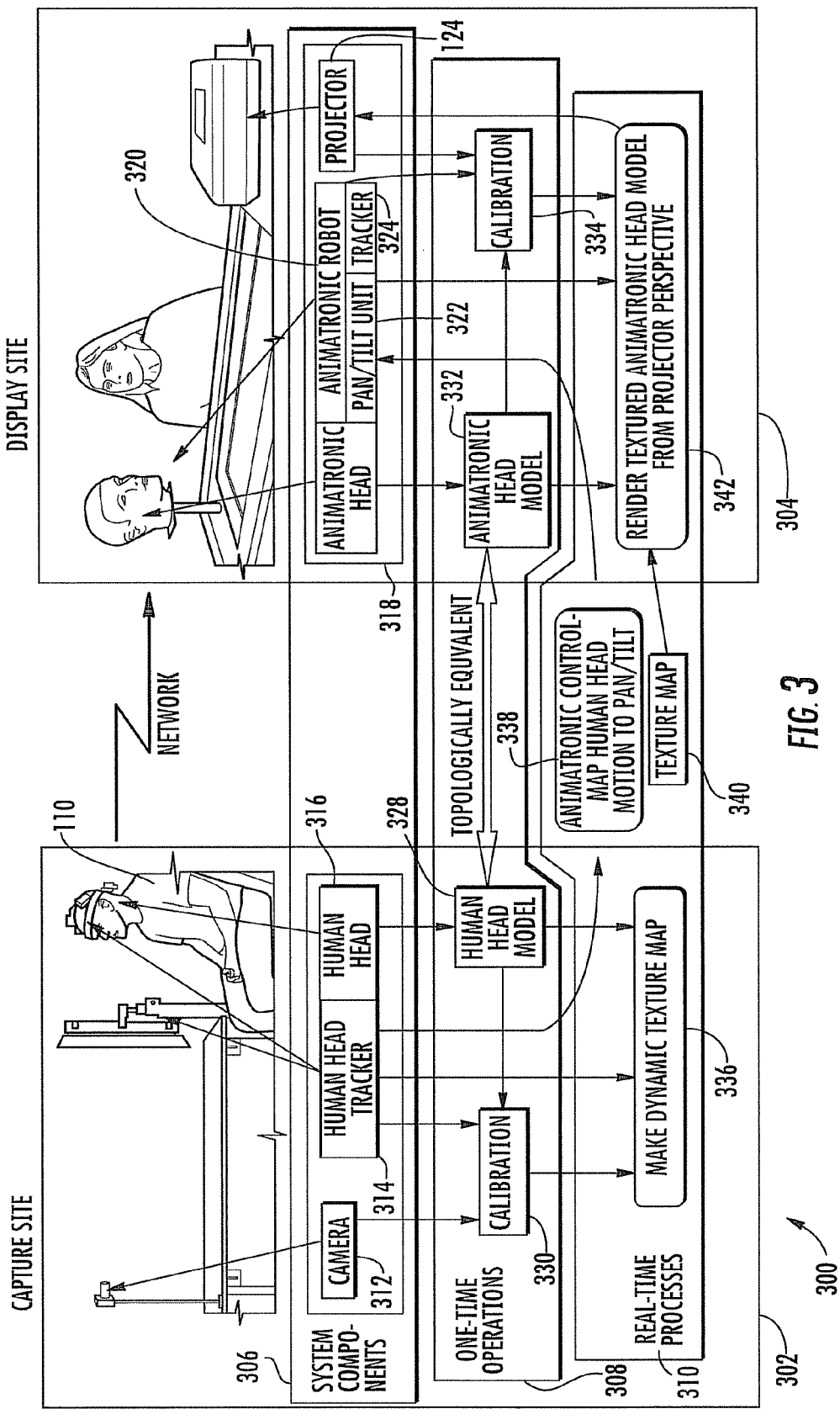
FIG. 3 is a block diagram of an exemplary system for projecting shader lamps-based avatars of real and virtual objects onto physical target objects where the capture site is remotely located from the display site according to an embodiment of the subject matter described herein.

FIG. 3 is a block diagram of an exemplary system for projecting shader lamps-based avatars of real and virtual objects onto physical target objects where the capture site is remotely located from the display site according to an embodiment of the subject matter described herein. Referring to FIG. 3, SLA system 300 may be logically divided into capture site 302 and display site 304. Capture site 302 may be where images, motion, and sounds of the source (e.g., a human subject) are captured. Display site 304 may be where rendered images and audio may be projected onto a target object (e.g., surrogate surfaces of an avatar). Display site 304 may also be where animatronic control of the avatar is implemented. Capture site 302 and display site 304 may be remotely located and connected by a suitable communications link for transmitting (uni- and/or bi-directionally) information among an inhabiter, an avatar, and those interacting with the inhabiter via the avatar.

In addition to a designated place for the human subject, the capture site may include a camera and a tracker, with a tracker target (e.g., headband) placed onto the human's head. It is appreciated that capture and display sites may be co-located or, alternatively, the capture and display sites may be separately located. Capture site 302 and display site 304 may each be logically divided into system components 306, one-time operations 308, and real-time processes 310 for projecting shader lamps-based avatars of real and virtual objects onto physical target objects. These will now be described in greater detail below.

System Components

At capture site 302, system components 306 may include camera 312, human head tracker 314, and human head 316.

Camera 312 may include any suitable device for capturing visual imagery of source object 110 or 112. Specifically, camera 312 may include a device having a lightproof chamber with an aperture fitted with a lens and a shutter through which the image of an object is projected onto a surface for recording (e.g., film) or for translation into electrical impulses (e.g., digital). Camera 312 may include a still and/or video camera.

Human head tracker 314 may include any suitable device to determining the position, orientation, and movement of an object (e.g., human head). For example, human head tracker 314 may include a headband apparatus worn around a user's head that may wirelessly (or wired) communicate signals indicating the position and orientation of the headband relative to a fixed point, from which the position and orientation of the user's head may be inferred. Other examples of human head tracker 314 may include infrared-based trackers and software-based methods for analyzing visual imagery obtained from camera 312.

Human head 316 may include the uppermost or forward-most part of the head of a human being, containing the brain and the eyes, ears, nose, mouth, and jaws. Human head 316 is an example of real source object 110 from which visual imagery may be captured. It is appreciated, however, that virtual source objects, and therefore virtual heads (not shown) may also be used for capturing visual imagery without departing from the scope of the subject matter described herein. Moreover, it may be appreciated that body parts in addition to human head 316 may be tracked (e.g., limbs, torso, hands, etc.) if desired.

At display site 304, system components 306 may include animatronic head 318, animatronic robot 320, pan/tilt unit 322, tracker 324, and projector 124. In one exemplary embodiment, SLA techniques could be used on a mobile avatar that can move around a building or outside, in a manner akin to an electric wheelchair or other mobile platform.

Animatronic head 318 may use mechanical and/or electrical components and systems to simulate or replicate the movements of humans or creatures. For example, a puppet or similar figure may be animated by means of electromechanical devices such as servos and actuators.

Animatronic robot 320 may include a single statically-shaped head, a single animatronic head 318, other body parts, or swappable versions of one or more of the above. For example, in one exemplary embodiment, the same approach used to capture, remap, and animate the shape, motion, and appearance of a head could be used to animate other body limbs or objects. Thus, in addition to animating just a user's head, it is appreciated that other body parts or objects may be animated (e.g., a texture may be projected and any physical movements may be controlled) without departing from the scope of the subject matter described herein. In another exemplary embodiment, removable body parts (or other objects) may be used that are manually or automatically identified by the system. For example, different avatar head models may be used depending on the geometry of the human inhabiter.

In another exemplary embodiment, avatar body parts or other objects could be made to contract, expand, or deform prior to or during normal operation. This might be done, for example, to accommodate people of different sizes, to give the appearance of breathing, or to open a mouth. A person of ordinary skill in the art will understand that the disclosed methods could be adjusted dynamically (the run-time mappings for example) to affect such changes.

Pan/tilt unit 322 may provide for accurate real-time positioning of objects and offer continuous pan rotation, internal wiring for payload signals, and be designed for both fixed and mobile applications.

Projector 124 may include any suitable means for projecting the rendered image of human head 316 onto animatronic head 318. The rendered image may be based on animatronic head model 332 to ensure correct rendering of video imagery, such as facial features and expressions. The rendered image may be based on a 3D texture map 340, which adds 3D surface detail to the projected image. In one example, projector 124 include a 1024×768 60 Hz digital light processing (DLP) projector mounted approximately 1 meter in front of animatronic head 318 and configured to project upon the visual extent, including range of motion, of animatronic head 318. While projector 124's focus and depth of field may be sufficient to cover the illuminated (i.e., front) half of animatronic head 318, it is appreciated that multiple projectors 124 may also be used to illuminate additional surrogate surfaces without departing from the scope of the subject matter described herein.

One-Time Operations

One-time operations may be performed when the system components are installed. As described above, these operations may include camera, projector, and tracker calibration, as well as head and avatar model construction and calibration. At capture site 302, one-time operations 308 may include construction of human head model 330 and calibration 328. At display site 304, one-time operations 308 may include creation of animatronic head model 332 and calibration 334. Each of these will now be described in greater detail below.

Animatronic Head Construction

As described above, construction of animatronic head 318 may include producing a life-size full or partial representation of the human head. While animatronic head 318 shown in FIG. 3 includes the ability to move portions of its surface/shape, such as its lips or eyebrows to better simulate the movements of source human head 316, it is appreciated that head 318 may be static as well. For example, a simple static avatar head 318 may be constructed out of Styrofoam™, wood, or another suitable material for having visual imagery projected upon it. In animatronic embodiments, avatar head 318 may include a rubber or latex surface covering a rigid and potentially articulable skeleton or frame and associated servos for animating the surface of avatar head 318.

Human Head Model Construction

In one embodiment, 3D head models (human and animatronic) may be made using FaceWorx [14], an application that allows one to start from two images of a person's head (front and side view), requires manual identification of distinctive features such as eyes, nose and mouth, and subsequently produces a textured 3D model. The process consists of importing a front and a side picture of the head to be modeled and adjusting the position of a number of given control points overlaid on top of each image.

One property of FaceWorx models is that they may all share the same topology, where only the vertex positions differ. This may allow for a straightforward mapping from one head model to another. In particular, one can render the texture of a model onto the shape of another. A person of ordinary skill in the art would understand that alternate methods could be used, as long as the model topology is preserved as described above.

Animatronic Head Model Construction

It is appreciated that human head model 328 and animatronic head model 332 may be topologically equivalent. Topological equivalency refers to the fact that spatial properties are preserved for any continuous deformation of human head model 328 and/or animatronic head model 332. Two objects are topologically equivalent if one object can be continuously deformed to the other. For example, in two dimensions, to continuously deform a surface may includes stretching it, bending it, shrinking it, expanding it, etc. In other words, any deformation that can be performed without tearing the surface or gluing parts of it together. Mathematically, a homeomorphism, f, between two topological spaces is a continuous bijective map with a continuous inverse. If such a map exists between two spaces, they are topologically equivalent. Therefore, construction of animatronic head model 332 may include simply morphing and re-morphing human head model 328.

Human Head Model Calibration

3D Vision-Based Tracking

Capturing the human head model and rendering the animatronic head model "on top of" the Styrofoam™ projection surface may include finding their poses in the coordinate frames of the trackers at each site. Both the human's and the avatar's heads are assumed to have a static shape, which may simplify the calibration process. The first step in this calibration is to find the relative pose of each head model with respect to a reference coordinate frame which corresponds to a physical tracker target rigidly attached to each head being modeled. In one embodiment of the present subject matter, a tracker probe is used to capture a number of 3D points corresponding to salient face features on each head and compute the offsets between each captured 3D point and the 3D position of the reference coordinate frame. Next, a custom GUI is used to manually associate each computed offset to a corresponding 3D vertex in the FaceWorx model. An optimization process is then executed to compute the 4×4 homogeneous transformation matrix that best characterizes (in terms of minimum error) the mapping between the 3D point offsets and the corresponding 3D vertices in the FaceWorx model. This transformation represents the relative pose and scale of the model with respect to the reference coordinate frame. The transformation matrix is then multiplied it by the matrix that characterizes the pose of the reference coordinate frame in the tracker's coordinate frame to obtain the final transformation.

In one exemplary implementation of the subject matter described herein, the calibration transformation matrices obtained through the optimization process are constrained to be orthonormal. As an optional final step in the calibration process, manual adjustments of each degree of freedom in the matrices may be performed by moving the animatronic head or by asking the human to move their head and using the movements of the corresponding rendered models as real-time feedback. This enables the calibration controller to observe the quality of the calibration. The same error metric that is used in the automatic optimization algorithm can be used in the manual adjustment phase in order to both reduce error while optimizing desirable transformations. Again, a person of ordinary skill in the art would understand that alternate methods for calibration could be employed.

Human Head Model Calibration

Hybrid 3D/2D Registration

In another embodiment, a hybrid of 3D and 2D methods, including feature tracking and registration on the avatar, may be used. Specifically, a combination of 3D vision-based tracking and 2D closed-loop image registration may be used to determine the position and orientation of one or more reference points on the source object. For example, initially, input cameras and vision-based tracking may be used to estimate the 3D position (and 3D orientation) of the human. Next, using the estimated position and orientation and a non-specific analytical head model, the locations of the facial features may be predicted (e.g., eyes, lips, silhouette, etc.). Next, the predictions may be used to search for the features in the actual input camera imagery. Using the 3D tracking on the output side (the avatar) and the analytical model of the avatar head, the locations of the corresponding features in the projector's image may be predicted. Finally, using uniform or non-uniform registration methods (e.g., Thin-Plate Spline, Multiquadric, Weighted Mean, or Piecewise Linear) the input camera imagery may be translated, rotated, scaled, and/or warped in order to align with the avatar head. Doing so would "close the loop" on the registration with the avatar head, thus allowing for some imprecision in the tracking on the input side and allowing the use of vision-based tracking of the human user without a need for instrumentation of the user.

Human Head Model Calibration

Other Methods

In another embodiment, infrared or other imperceptible markers on the avatar head may be used as "targets" to guide the registration with corresponding reference points on the source object. For example, a camera may be mounted co-linearly (or approximately so) with the projector and the final 2D transformation and any warping of input side facial features with these markers as the targets may be performed.

Camera and Projector Calibration

The camera at the capture site and the projector at the display site may be calibrated using any suitable calibration method. In one embodiment, intrinsic and extrinsic parameters of a camera may be calibrated at the capture site using a custom application [8] built on top of the OpenCV [18] library. Multiple images of a physical checkerboard pattern placed at various positions and orientations inside the camera's field of view may be captured and saved (e.g., to a hard disk drive). The 2D coordinates of the corners in each image may be automatically detected using the OpenCV cvFindChessboardCorners function. Using the ordered lists of checkerboard corners for each image, the intrinsic parameters may be computed via the OpenCV cvCalibrateCamera2 function. The extrinsic parameters in the tracker coordinate frame may then be computed as described hereinbelow. First, the pattern may be placed in a single fixed position and an image of the pattern may be captured to detect the 2D corners in the image in a manner similar to that described above. Next, a tracker probe may be used to capture the 3D locations corresponding to the pattern corners in the tracker's coordinate frame. Finally, the captured 3D points may be inputted to the cvFindExtrinsicCameraParams2 OpenCV function using the corresponding 2D corner locations and the previously computed intrinsic matrix. This may be produce the camera's extrinsic matrix in the coordinate frame of the capture side tracker. Using such a technique, re-projection error may be on the order of a pixel or less.

Projector 124 at display site 304 may be calibrated using a similar process to that described above. Instead of capturing images of the checkerboard pattern, a physical checkerboard pattern may be placed at various positions and orientations inside the projector's field of view, and the size and location of a virtual pattern may be rendered and manually adjusted until the virtual pattern matches the physical pattern. The rendered checkerboard images may be saved to disk and the OpenCV-based application and the tracker probe may be used as described above with respect to camera calibration 330. This method may produce projector 124's intrinsic and extrinsic matrices in the coordinate frame of the display side tracker.

Tracker Calibration

Head tracker 314 may be assumed to be rigidly mounted onto the head. However, each time the user dons head tracker 314, the position and orientation may be slightly different. Although a complete calibration prior to each run would ensure the best results, in practice small manual adjustments are sufficient to satisfy the above assumption.

Initially, the poses of the pan-tilt unit and of the human head may be aligned. For example, the user may rotate his or her head and look straight at the camera in order to capture a reference pose. This pose may be set to correspond to the zero pan and zero tilt pose of the pan-tilt unit, which positions the Styrofoam™ head as if it were directly facing the projector. Additional manual adjustments may be performed to the headband to ensure that the projections of salient face features in the projected image are aligned with the corresponding features on the animatronic head. These features may include the positions of the eyes, tip of the nose, and edges of the mouth.

Real-Time Processes

Once the system is calibrated, it becomes possible for the avatar on the display side to mimic the appearance and motion of the person on the capture side. Real-time processes 310 may include dynamic texture map creation 336 and rendering textured animatronic head model from a projector perspective 342, and, optionally, animatronic tracking and control.

Computing a Dynamic Texture Map

One real-time process that occurs is the computation of a dynamic texture map. For example, given a calibrated input camera, a tracked human, and a calibrated 3D model of the human's head, a texture map is computed for the model. This may be achieved through texture projection; the imagery of the camera is projected upon the surface of the head model as though the camera were a digital projector and the human head the projection surface. In the presently described embodiment, OpenGL vertex and pixel shaders are used, which allows viewing a live textured model of the human head in real time from any point of view. It is appreciated that other means for computing the maps may be used without departing from the scope of the subject matter described herein.

Texture map 340 may be computed using calibrated human head model 328 and the resulting live imagery may be projected onto calibrated avatar head model 318. If for example both heads 316 and 318 are modeled in FaceWorx, they will have the same topology, making the texture projection to target the avatar's head more straightforward. An OpenGL vertex shader that takes as input the avatar's tracker, calibration, and model vertex positions is used to compute the output vertices. An OpenGL pixel shader that takes the human's tracker, the calibration model and the vertices computed by the vertex shader may as input is used to compute the output texture coordinates. Through these shaders, it would be possible to render a textured model of the avatar from a variety of perspectives, using a live texture from camera imagery of the human head. By selecting the perspective of the calibrated projector, the live texture would be projected upon the tracked animatronic head, and the model shape morphed to that of the animatronic head model. Using this process, the animatronic head will emulate the appearance of its human counterpart.

Rendering Textured Animatronic Head Model

Rendering textured animatronic head model from a projector perspective 342 may include using shader lamps techniques. Shader lamps techniques utilize one or more projectors that project captured images of a physical object with its inherit color, texture, and material properties onto a neutral object so that the neutral object will appear as the physical object. As shown in FIG. 3, shader lamp projector 124 may be used to project captured imagery 342 of a real human 316 onto an animatronic human 318 or avatar so that the animatronic human or avatar will appear as the human.

Animatronic Tracking and Control

Given a pose for a human head tracked in real time and a captured reference pose captured, a relative orientation may be computed. This orientation constitutes the basis for the animatronic control signals for the avatar. The pose gathered from the tracker is a 4×4 orthonormal matrix consisting of rotations and translations from the tracker's origin. The rotation component of the matrix can be used to compute the roll, pitch, and yaw of the human head. The relative pitch and yaw of the tracked human may be mapped to the pan and tilt capabilities of the pan-tilt unit and transformed into commands issued to the pan-tilt unit. Using this process, the avatar may emulate (a subset of the head) motions of its human "master."

However, humans are capable of accelerating faster than the available pan-tilt unit's capabilities. Additionally, there may be a response delay (i.e., lag) between movements by a human inhabiter and the PTUs ability to move the animatronic head accordingly. This combination of factors can result in the avatar's head slightly motion lagging behind the most recently reported camera imagery and corresponding tracker position. For example, in many systems there may be about a 0.3 second discrepancy between the camera and tracking system. One solution to this includes buffering the video imagery and tracker position information to synchronize the two data sources. This relative lag issue could also be mitigated by a more responsive pan-tilt unit or good-quality predictive filtering on the expected PTU motions. A person of ordinary skill in the art could do either, or use other approaches to mitigate the delay.

Figure 4:
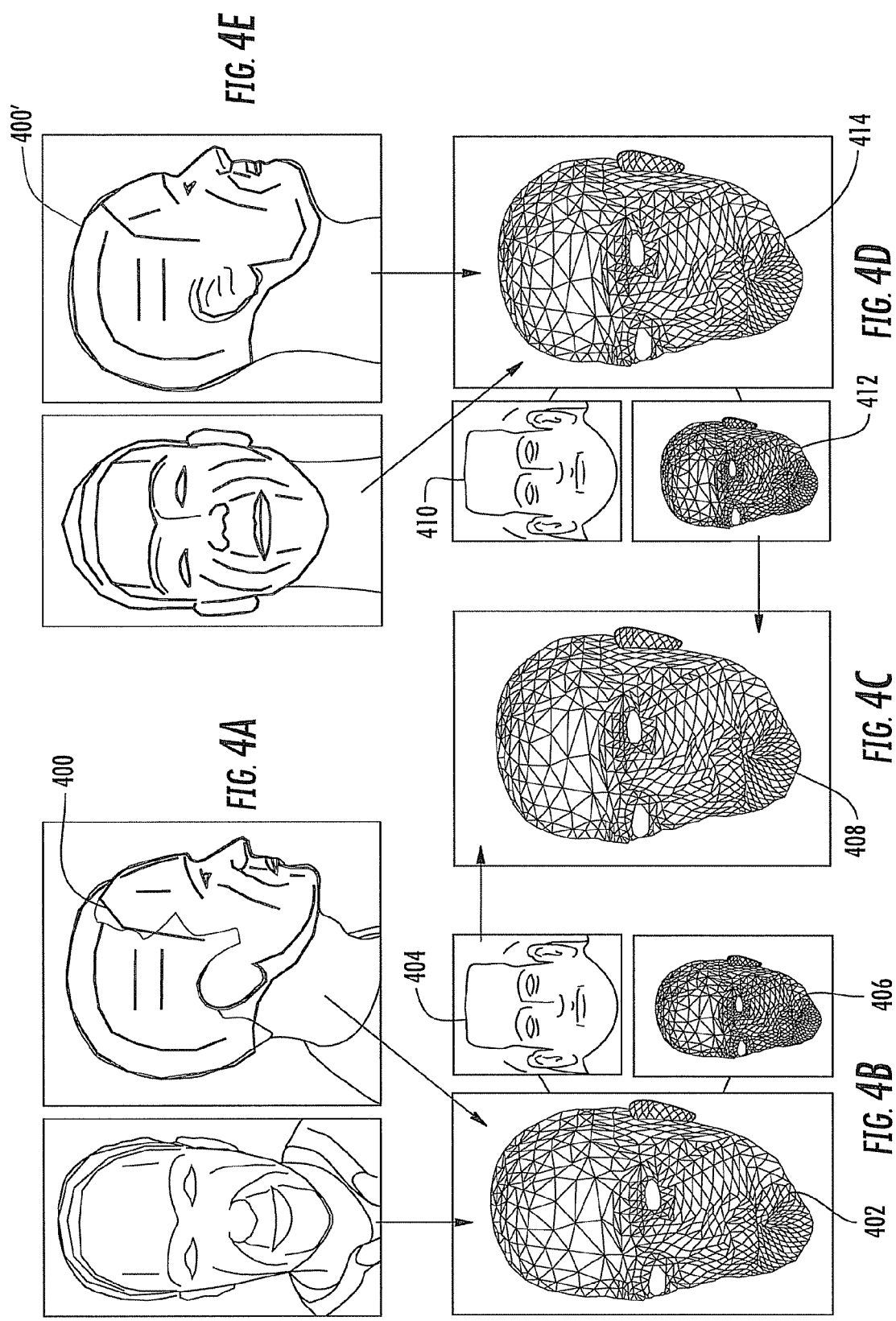
FIGS. 4A-4E are diagrams illustrating exemplary calibration and mapping stages for projecting shader lamps-based avatars of real and virtual objects onto physical target objects according to an embodiment of the subject matter described herein.

FIGS. 4A-4E are diagrams illustrating exemplary calibration and mapping stages for projecting shader lamps-based avatars of real and virtual objects onto physical target objects according to an embodiment of the subject matter described herein. Referring to FIG. 4A, reference points on source object 400 may be determined. Based on these reference points, a more detailed source 3D model 402 may be calculated. Referring to FIG. 4B, source 3D model 402 may be decomposed into texture map 404 and wireframe model 406. In FIG. 4C, source 3D model 402 may be morphed and mapped to fit the size and shape of the target object, thereby creating an intermediate model 408. In FIG. 4D, the reverse process may be performed in order to re-compose target 3D mesh model 414 from texture map 410 and wireframe model 412. Finally, in FIG. 4E, target 3D model 414 may be projected onto the target object in order to create avatar head 400'. As can be seen from a comparison of FIGS. 4A and 4E, the sizes and locations of various facial features may differ between source and target objects. However, the morphing, mapping, re-morphing, and re-mapping of head model 408 may generally succeed in ensuring that an image of source object's right ear is projected onto the "right ear" area of the target object, and so forth for other important reference points.

Figure 5:
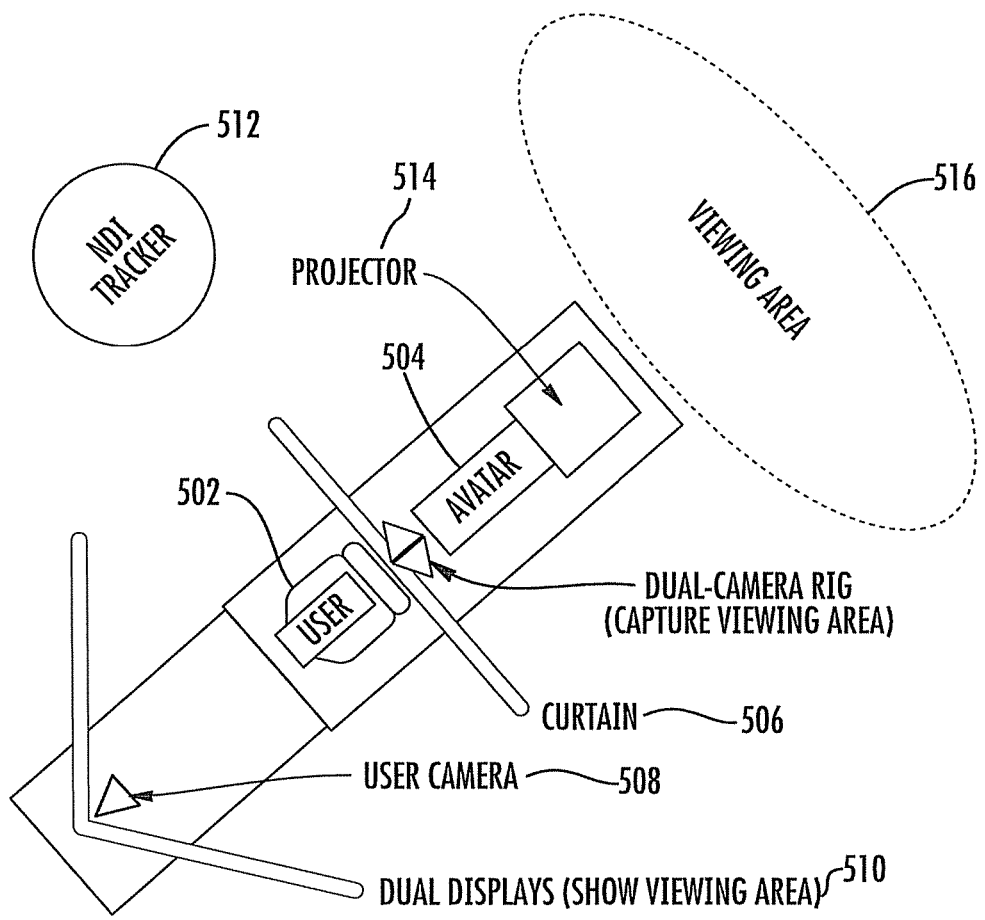
FIG. 5 is top-down view of an exemplary system for projecting shader lamps-based avatars of real and virtual objects onto physical target objects where the capture site is local to the display site according to an embodiment of the subject matter described herein.

FIG. 5 is a top view of an exemplary system for providing shader-lamps based physical avatars of real and virtual people according to an embodiment of the subject matter described herein, where the capture and display are collocated. For example, referring to FIG. 5, capture and display sites are shown in a back-to-back configuration, separated by a large opaque curtain. The result is that the capture site is not directly visible to casual visitors, who therefore must interact only with the SLA. As indicated above, the capture and display sites could be separated geographically, connected only by a computer network.

As shown in FIG. 5, the capture site is equipped with a panoramic dual-projector setup; the two projectors are connected to a dual-camera rig mounted just above the avatar's head at the display site. The fields of view of the camera rig and of the projection setup are matched, aligning the gaze directions of the human user at the capture site and of the avatar at the remote site. That is, if the human user turns his or her head to face a person appearing 15 degrees to the right on the projective display, the slaved avatar head will also turn by 15 degrees to directly face that same person.

System configuration 500 includes user 502 acting as the source input for avatar 504. As mentioned above, user 502 and avatar 504 may be separated by curtain 506 in order to force others to interact with avatar 504 by preventing direct communication with user 502. This configuration is logically analogous to a configuration where user 502 and avatar 504 are physically separated by a larger distance yet is easier to implement for demonstration purposes.

On the capture side, user camera 508 may capture image data of user 502. Additionally, as discussed above, audio or other information may also be captured. In order for user 502 to see what avatar 504 sees, display 510 may be presented to user 502 for displaying the viewing area seen by avatar 504. In the example shown, display 510 includes a curved surface onto which one or more projectors project an image. However, it is appreciated that other display technologies may be used without departing from the scope of the subject matter described herein, such as LCD, PDP, DLP, or OLED.

On the display side, tracking system 512 may track the movements of avatar 504. One or more projectors 514 may project image data onto the display surface of avatar 504. For example, a first projector may be located so as to illuminate the left side of avatar 504 and a second projector may be located so as to illuminate the right side of avatar 504. Viewing area 516 may be an area in which viewers may be located in order to interact with avatar 504. As shown, viewing area includes a space approximately facing avatar 504.

Determining Optimal Display Surface

According to another aspect of the present subject matter, a method for finding the optimal physical display surface shape to use for displaying one or more virtual objects that will be viewed from multiple perspectives is disclosed. When using shader lamps [20] to create a dynamic physical representation of a virtual object, the physical display surface and the corresponding appearance and shape parameters may be important. The term "optimal" refers to a display surface that minimizes some criteria, for example the angular viewing error that arises when the virtual object is viewed from somewhere other than the rendering viewpoint, and the virtual object surface is different from the physical display surface. If that happens, features on the virtual surface can appear in the wrong place on the physical display surface.

Figure 6:
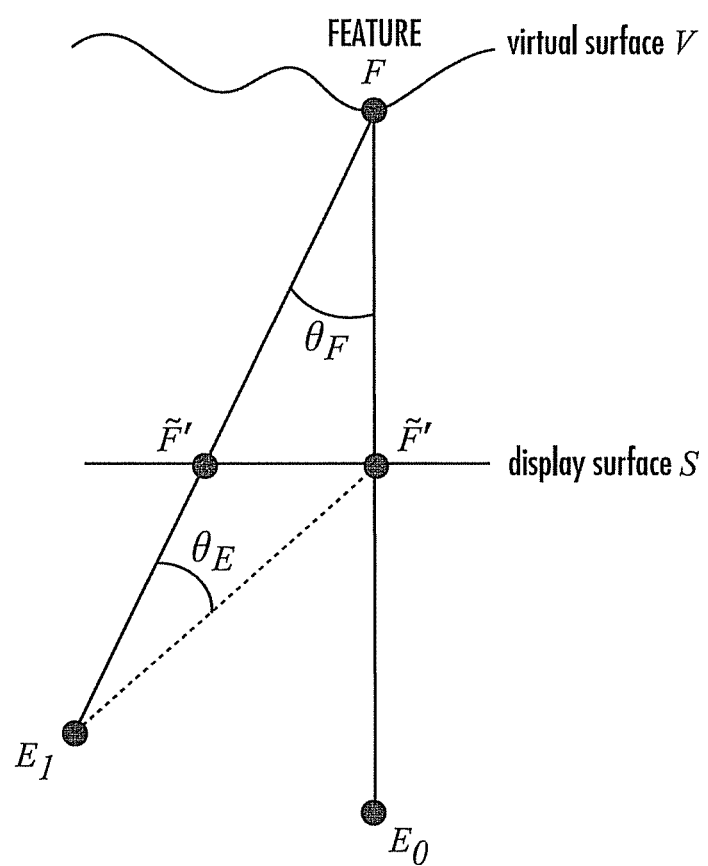
FIG. 6 is a diagram showing a mathematical relationship between a virtual surface and a display surface for determining an optimal display surface shape of a shader-lamps based physical avatar according to an embodiment of the subject matter described herein.

FIG. 6 is a diagram illustrating the circumstances surrounding the computation of an optimal physical display surface shape of a shader lamps-based physical avatar, where angular viewing error is the criteria for optimization. The goal in this case would be to display one or more virtual objects viewed from multiple perspectives according to an embodiment of the subject matter described herein. Referring to FIG. 6, virtual surface V and the physical display surface S are at different locations and have different shapes. Now consider rendering a feature F of the virtual surface V from eye point $E_0$, and using a digital light projector to project that feature onto the physical display surface S at F'. As long as the physical display surface is viewed from eye point $E_0$, the rendered feature F' will appear to be in the proper place, i.e. it will be indistinguishable from F. However if the physical display surface was to be viewed from $E_1$, the virtual feature F should appear at location $F^{-1}$, but unless the virtual surface is re-rendered from eye point $E_1$, the feature will remain at point F' on the physical display surface S. This discrepancy results in an angular viewing error $\theta_E$ radians, where $\theta_E = 2\pi - \theta_F$, and $\theta_F = \arctan((F^{-1}-F')/(F'-F))$.

If the physical display surface was to be viewed only from one eye point $E_0$, the solution would be trivial as the physical display surface shape would not matter. However, in the more general case, the physical display surface will be viewed from many perspectives (eye points), the virtual and physical display surfaces will be different, and thus viewing errors will arise as the viewer moves away from the rendered viewpoint.

Consider a physical display surface $S=f(\pi_1, \pi_2, \ldots, \pi_{n\pi})$, where $\pi_1, \pi_2, \pi_{n\pi}$ are the $n_\pi$ parameters that determine the surface shape, for some shape function f. Next, consider a set of virtual objects $V=\{V_0, V_1, \ldots, V_{nV}\}$, a set of candidate eye points $E=\{E_0, E_1, \ldots, E_{nE}\}$, and a set of object features $F=\{F_0, F_1, \ldots, F_{nF}\}$. If available one can rely on feature correspondences for all F over the physical display surface model and all of the virtual models, i.e. over $\{S, V_0, V_1, \ldots, V_{nV}\}$. Such correspondences could, for example, be established by a human. Such correspondences would allow the virtual objects to be compared with the physical display surface in a straightforward manner.

If the optimization space $(\pi_0, \pi_1, \ldots, \pi_{n\pi}, V, E, F)$ is tractable, the optimization of the physical display surface S could be carried out by an exhaustive search. It is appreciated that a nonlinear optimization strategy, such as Powell's method, may be used.

Figure 7:
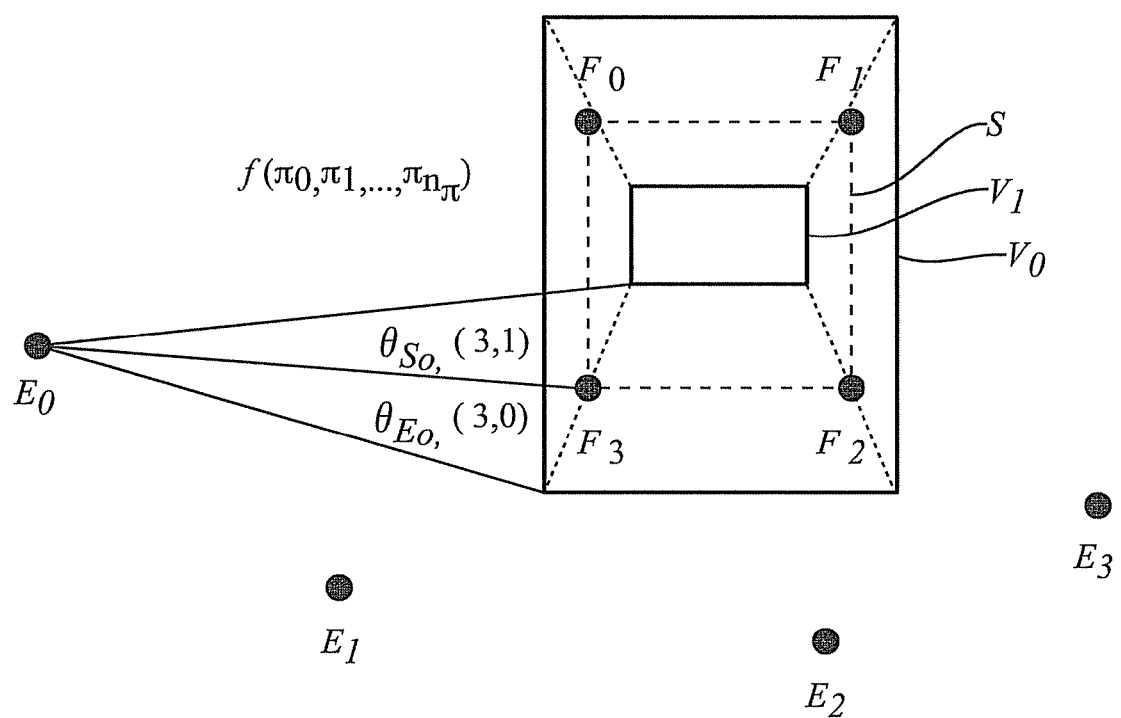
FIG. 7 is a diagram showing an exemplary 2D scenario for assessing the viewing error for a given display surface candidate S according to an embodiment of the subject matter described herein.

FIG. 7 is a diagram showing an exemplary 2D scenario for assessing the viewing error for a given display surface candidate S according to an embodiment of the subject matter described herein. In the simple 2D example shown in FIG. 12, a rectangular physical display surface $S=f(\pi_1,\pi_2)$ shown in dashed lines ($\pi_1$=height and $\pi_1$=width) is to be fitted to two virtual rectangular objects $V=\{V_0, V_1\}$, with the scene potentially viewed from the eye points $E=\{E_0, E_1, E_2, E_3\}$. The physical display surface S and the virtual objects V all have corresponding features $F=\{F_0, F_1, F_2, F_3\}$, illustrated with thin dotted lines in FIG. 12. The angular error perceived from eye point $E_{-0}$ when looking at feature $F_3$ would be $\theta_{E0}$, (3,0) for virtual object $V_0$, and $\theta_{E0}$, (3,1) for virtual object $V_1$. To find the optimal surface one can loop through all of the possible width and height values for the surface, then for each virtual surface, for each eye point, and for each feature, check the aggregate error (for example, root-mean-square error).

Algorithm 1 is a pseudo-code description of an exemplary optimization algorithm for providing shader-lamps based physical avatars of real and virtual people according to an embodiment of the subject matter described herein. The term "aggregate" in Algorithm 1 refers to the aggregate objective function used to assess the viewing error over all features, virtual models, and eye points, for a given display surface candidate S. For example, average feature error, maximum, or the root-mean-square (RMS) may be used to assess the viewing error.

Algorithm 2 is a pseudo-code description of an exemplary optimization algorithm for providing shader-lamps based physical avatars of real and virtual people according to an embodiment of the subject matter described herein.

---

Algorithm 1: Optimization pseudocode.

$e_{min} = 0$
$S_{best} = \phi$
foreach $\pi_0, \pi_1, \ldots, \pi_{n_\pi}$ do
  $S = f(\pi_0, \pi_1, \ldots, \pi_{n_\pi})$
  foreach $V_i \in V$ do
    foreach $E_j \in E$ do
      foreach $F_k \in F$ do
        $e_k = \theta_E(S, V_i, E_j, F_k)$
      $e = \text{aggregate}(e_0, e_1, \ldots, e_{n_F})$
      if $e < e_{min}$ then
        $S_{best} = S$
        $e_{min} = e$

---

Algorithm 2: Example optimization of a 2D rectangular surface, using minimum RMS aggregate view error as the objective.

$e_{min} = 0$
$S_{best} = \phi$
$n_V = 2$ (two virtual models)
$n_E = 4$ (four eye points)
$n_F = 4$ (four features per object)
for $\pi_0 \leftarrow \text{width}_{min}$ to $\text{width}_{max}$ do
  for $\pi_1 \leftarrow \text{height}_{min}$ to $\text{height}_{max}$ do
    $S = f(\pi_0, \pi_1)$
    for $0 \leq i < n_V$ do
      for $0 \leq j < n_E$ do
        for $0 \leq k < n_F$ do
          $e_k = \theta_E(S, V_i, E_j, F_k)$
        $e = \sqrt{\left(\sum_{k=0}^{n_F} e_k^2\right)/n_F}$
        if $e < e_{min}$ then
          $S_{best} = S$
          $e_{min} = e$

---

This approach could be used to accommodate multiple inhabiters, postures, or objects. For example, if each of $V_0$, $V_1, \ldots, V_{nV}$ could be a virtual model of a different person, all of whom one wants to represent on the same physical display surface. Or, each could for example model a different pose of the same person, allowing one to project different postures onto the same (static) physical display surface. This approach could be used to realize "synthetic animatronics"—the appearance of an animated component when the physical surface is not actually moving.

It is appreciated that the subject matter described herein for computing optimal display surfaces is not limited to heads or human avatars. The same approach can be used for any objects, small or large.

Example Applications

The subject matter described herein for projecting shader lamps-based avatars of real and virtual objects onto physical target objects may be applied to various real-world applications such as medical training, military training, remote meetings, and distance education. Some of these exemplary applications will now be described in greater detail below. It is appreciated that the example applications described below are meant to be illustrative, not exhaustive.

RoboDoc

FIGS. 8A and 8B are illustrations of an exemplary medical application of shader-lamps based physical avatars of real and virtual people according to an embodiment of the subject matter described herein. In the embodiment shown in FIGS. 8A and 8B, a virtual surrogate for a real doctor could move around a remote facility and interact with patients or other medical personnel. The virtual surrogate (i.e., avatar) would allow the real, remotely located doctor to see what the avatar sees and to be seen as if he were really there. Specifically, FIG. 8A depicts the capture site and FIG. 8B depicts the display site, where the capture and display sites are remotely located and connected via a high-speed network connection. It is appreciated that, as used herein, regular numbers refer to actual physical entities (e.g., a live human being) while corresponding prime numbers (i.e., numbers followed by an apostrophe) refer to an image of the corresponding physical entity (e.g., image projected on an avatar) displayed on surrogate surface(s).

Referring to FIG. 8A, real doctor 800 may be located inside of a capture site bubble including a surround screen 802 onto which images of the surrounding as viewed by avatar 800' may be displayed, and a plurality of cameras 804 for capturing visual imagery of real doctor 800 for projection onto mobile avatar 800' (aka DocBot).

Referring to FIG. 8B, avatar 800' may include a mannequin or animatronic robot placed inside of a mobile apparatus. The mobile apparatus surrounding the avatar 800' may include a plurality of projectors 808 for projecting visual imagery onto the surrogate surface(s) of the mannequin. Patients 806 may interact with avatar 800' as they normally would if the real doctor were actually physically present in the same room. Specifically, gaze direction may be appropriately determined based on the location, movement, and position of avatar 800' relative to physical patients 806.

Alternatively, an avatar could be used for a remote patient, for example allowing distant surgeons to stand around a dynamic physical avatar (mannequin) of a real remote patient on a real surgical table. The hands of the doctors at both ends could be shown on the real/virtual patient to aid in communication—seeing incisions and suturing for example, while being able to directly point to areas of concern, etc.

Remote Meeting

This could be used for example for education (the avatar could be inhabited by teachers or students), and to remotely attend meetings or conferences.

Distance Education

In yet another exemplary embodiment, the subject matter described herein may be used for providing distance education. Distance education, or distance learning, delivers education to students who are not physically located "on site" by providing access to educational resources when the source of information and the learners are separated by time and distance, or both. For example, a collection of students may be located in a classroom including an avatar "teacher" in a remote location (e.g., a village in Zambia) while a teacher located in a different location (e.g., Durham, N.C.) may inhabit the avatar. Because the students may interact with the avatar in a more natural way, including being able to understand the intended target of the teacher's gaze by observing the direction of the avatar's head/eyes.

Medical Training

Human Patient Simulator

In yet another exemplary embodiment, the same SLA techniques would be applied to a medical human patient simulator (HPS) to provide the added dimension of realistic appearance and motion to the conventional physiological simulations. For example, an HPS could open its eyes and look at the medical trainee, perhaps tilting its head, and moving its mouth (or simply appearing to move its mouth) to vocalize concerns about pain, fear, etc. (i.e., add human behavior to the HPS.) Similarly the techniques could be used to dynamically change the skin color, e.g., to give it a blue tint (characteristic of a lack of oxygen) or a yellow tint (jaundice). Similarly, the technique could be used to add a dynamic wound (e.g., bleeding or pulsing) to a body part. Exemplary HPS devices suitable for being combined or integrated with the shader lamps techniques described herein may include the METIman™, HPS®, and iStan® produced by Medical Education Technologies, Inc. (METI) of Sarasota, Fla. and the SimMan® 3G and Resusci Anne® produced by Laerdal, Inc. of Stavanger, Norway.

Bi-Directional Telepresence

A realistic looking mobile robotic avatar could prove especially valuable to disfigured or immobile individuals (e.g., paraplegic, polytrauma, burn survivors), allowing them to virtually move around a shopping mall for example, interacting with friends and sales people as if they were actually there. They could even be made to appear as they did before the trauma.

Military Training

In yet another exemplary embodiment, the SLA techniques described herein can be used to create realistic 3D avatars for human-scale training exercises, for example live-virtual training in large "shoot houses" where Marines or soldiers encounter virtual humans. The SLA units could be used in alternating fashion to represent "good guys" or "bad guys" in a mock town, for example. For example, a mobile avatar could be made to look like a virtual police officer while roving around a city, and at select times it could be "taken over" by a real police officer, for example to ask questions or provide assistance. When the discussion was complete, the unit could transition back to a virtual police officer doing automated patrols. The apparent identity of the avatar might remain constant through such transitions, thus providing a consistent appearance.

The disclosure of each of the following references is hereby incorporated herein by reference in its entirety.

REFERENCES

[1] J. Ahlberg and R. Forchheimer. Face tracking for model-based coding and face animation. International Journal of Imaging Systems and Technology, 13(1):8-22, 2003.

[2] AIST. Successful development of a robot with appearance and performance similar to humans. http://www.aist.go.jp/aiste/latest research/2009/20090513/20090513.html, May 2009.

[3] D. Bandyopadhyay, R. Raskar, and H. Fuchs. Dynamic shader lamps: Painting on real objects. In Proc. IEEE and ACM international Symposium on Augmented Reality (ISAR '01), pages 207-216, New York, N.Y., USA, October 2001. IEEE Computer Society.

[4] J. L. DeAndrea. AskART. http://www.askart.com/askart/d/johnlouis de andrea/john louis de andrea.aspx, May 2009.

[5] R. Epstein. My date with a robot. Scientific American Mind, June/July: 68-73, 2006.

[6] Honda Motor Co., Ltd. Honda Worldwide—ASIMO. http://world.honda.com/ASIMO/, May 2009.

[7] T. S. Huang and H. Tao. Visual face tracking and its application to 3d model-based video coding. In Picture Coding Symposium, pages 57-60, 2001.

[8] A. Ilie. Camera and projector calibrator. http://www.cs.unc.edu/adyilie/Research/CameraCalibrator/, May 2009.

[9] H. Ishiguro. Intelligent Robotics Laboratory, Osaka University. http://www.is.sys.es.osaka-u.ac.jp/research/index.en.html, May 2009.

[10] A. Jones, M. Lang, G. Fyffe, X. Yu, J. Busch, I. McDowall, M. Bolas, and P. Debevec. Achieving eye contact in a one-to-many 3d video teleconferencing system. In SIGGRAPH '09: ACM SIGGRAPH 2009 papers, pages 1-8, New York, N.Y., USA, 2009. ACM.

[11] A. Jones, I. McDowall, H. Yamada, M. Bolas, and P. Debevec. Rendering for an interactive 360° light field display. In SIGGRAPH '07: ACM SIGGRAPH 2007 papers, volume 26, pages 40-1-40-10, New York, N.Y., USA, 2007. ACM.

[12] T. Laboratory. Various face shape expression robot. http://www.takanishi.mech.waseda.ac.jp/top/research/docomo/index.htm, August 2009.

[13] P. Lincoln, A. Nashel, A. Ilie, H. Towles, G. Welch, and H. Fuchs. Multi-view lenticular display for group teleconferencing. Immerscom, 2009.

[14] LOOXIS GmbH. FaceWorx. http://www.looxis.com/en/k75. Downloads Bits-and-Bytes-to-download.htm, February 2009.

[15] M. Mod. The uncanny valley. Energy, 7(4):33-35, 1970.

[16] D. Nguyen and J. Canny. Multiview: spatially faithful group videoconferencing. In CHI '05: Proceedings of the SIGCHI conference on Human factors in computing systems, pages 799-808, New York, N.Y., USA, 2005. ACM.

[17] D. T. Nguyen and J. Canny. Multiview: improving trust in group video conferencing through spatial faithfulness. In CHI '07: Proceedings of the SIGCHI conference on Human factors in computing systems, pages 1465-1474, New York, N.Y., USA, 2007. ACM.

[18] OpenCV. The OpenCV library. http://sourceforge.net/projects/opencvlibrary/, May 2009.

[19] R. Raskar, G. Welch, and W. C. Chen. Table-top spatially-augmented reality: Bringing physical models to life with projected imagery. In IWAR '99: Proceedings of the 2nd IEEE and ACM International Workshop on Augmented Reality, page 64, Washington, D.C., USA, 1999. IEEE Computer Society.

[20] R. Raskar, G. Welch, K. L. Low, and D. Bandyopadhyay. Shader lamps: Animating real objects with image-based illumination. In Eurographics Work-shop on Rendering, June 2001.

[21] O. Schreer, I. Feldmann, N. Atzpadin, P. Eisert, P. Kauff, and H. Belt. 3D Presence—A System Concept for Multi-User and Multi-Party Immersive 3D Videoconferencing. pages 1-8. CVMP 2008, November 2008.

[22] Seeing Machines. faceAPI. http://www.seeingmachines.com/product/faceapi/, May 2009.

[23] H. J. Shin, J. Lee, S. Y. Shin, and M. Gleicher. Computer puppetry: An importance-based approach. ACM Trans. Graph., 20(2):67-94, 2001.

[24] S. Tachi. http://projects.tachilab.org/telesar2/, May 2009.

[25] S. Tachi, N. Kawakami, M. Inami, and Y. Zaitsu. Mutual telexistence system using retro-reflective projection technology. International Journal of Humanoid Robotics, 1(1):45-64, 2004.

[26] T. Yotsukura, F. Nielsen, K. Binsted, S. Morishima, and C. S. Pinhanez. Hypermask: Talking head projected onto real object. The Visual Computer, 18(2):111-120, April 2002.

The subject matter described herein can be used to project images onto robotic virtual surrogates. A realistic looking robotic virtual surrogate could prove especially valuable to polytrauma and burn victims, both within and beyond the military, by allowing the disfigured or immobile individuals to (for example) move around a shopping mall, interacting with friends and sales people as if they were there. They could even be made to appear as they did before the trauma. Dr. Chris Macedonia, Medical Science Advisor to the Chairman of the Joint Chiefs of Staff at the Pentagon, used the phrase "prosthetic presence" to describe this application of the proposed technology. Dr. Macedonia noted that while the number of individuals in the military who might benefit from such technology could be relatively small (on the order of hundreds at the moment), the benefit to those individuals could be immense. One of our closest medical collaborators at UNC, Dr. Bruce Cairns, is the director of the Jaycee Burn Center. We believe he would be enthusiastic about the eventual application of this technology to help burn victims in general.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for projecting shader lamps-based avatars onto physical target objects, the method comprising:
using a processor:
obtaining, at a capture site, visual information of a human source object, wherein the human source object is a human user's head and wherein obtaining the visual information further comprises determining a source position and orientation of the human user's head;
generating, from the visual information of the human source object, a virtual 3D model of the human source object;
generating a texture map for the virtual 3D model of the human source object by projecting the visual information onto the virtual 3D model of the human source object;
determining a target position and orientation of a 3D physical target object and generating a virtual 3D model of the physical target object, wherein the 3D physical target object comprises an avatar of a human head and animatronics for controlling movement of the avatar of the human head;

rendering a textured head model for the human source object from a projector perspective using the texture map for the virtual 3D model of the human source object and the virtual 3D model of the physical target object; and displaying, at a display site remote from the capture site, the rendering of the textured head model for the human source object directly on a surface of the physical target object by controlling movement of the avatar of the human head using the animatronics and the source position and orientation of the human user's head at the capture site, and by projecting light onto the avatar of the human head using the target position and orientation to mimic the appearance and motion of the human user's head at the capture site.

2. The method of claim 1 comprising, in real time, continuously and repeatedly obtaining the visual information of the human source object and controlling movement of the avatar of the human user's head using the animatronics to mimic the appearance and motion of the human user's head in real time.

3. The method of claim 1 wherein:
generating the virtual 3D model of the human source object includes providing an initial mapping between coordinate data associated with features of the source and target objects; and
rendering the textured head model includes determining the shape of the target object, morphing the initial mapping based on the determined shape of the target object, and re-mapping the morphed data set to the target object.

4. The method of claim 1 comprising decoupling shape, pose, and/or appearance of the human source object from shape, pose, and/or appearance of the physical target object.

5. The method of claim 1 wherein displaying the rendering of the textured head model includes using a flexible or shapeable surface-based display that approximately corresponds to the shape of the physical target object.

6. The method of claim 1 wherein displaying the rendering of the textured head model includes one of projection, emission, and transmission of the rendering of the textured head model.

7. The method of claim 6 wherein projection of the rendering of the textured head model includes using one or more projectors located at various positions around the target object.

8. The method of claim 6 wherein projection of the rendering of the textured head model includes using one of front projection and inside/rear projection.

9. The method of claim 6 wherein emission of the rendering of the textured head model includes using one of a plasma display panel (PDP), a light emitting diode (LED)-based display, an organic LED (OLED) display, and an active matrix OLED (AMOLED) display.

10. The method of claim 6 wherein transmission of the rendering of the textured head model includes using a liquid crystal display (LCD).

11. The method of claim 1 wherein displaying the rendering of the textured head model includes projecting context-sensitive visual information for providing prosthetic presence where an image of an individual as the individual appeared prior to trauma is projected onto a robotic surrogate, through which the individual is enabled to interact with an environment.

12. The method of claim 1 wherein the size and shape of the physical target object is determined based on at least one of the size of the human source object, the shape of the human source object, and the position of a viewer relative to the target object.

13. The method of claim 1 comprising capturing audio information from the human source object and synchronizing the presentation of the audio information with the rendering of the textured head model.

14. A system for projecting shader lamps-based avatars onto physical target objects, the system comprising:
an input module for:
obtaining, at a capture site, visual information of a human source object, wherein the human source object is a human user's head and wherein obtaining the visual information further comprises determining a source position and orientation of the human user's head;
generating, from the visual information of the human source object, a virtual 3D model of the human source object;
generating a texture map for the virtual 3D model of the human source object by projecting the visual information onto the virtual 3D model of the source object;
determining a target position and orientation of a 3D physical target object and generating a virtual 3D model of the physical target object, wherein the 3D physical target object comprises an avatar of a human head and animatronics for controlling movement of the avatar of the human head;
a mapping module for rendering a textured head model for the human source object from a projector perspective using the texture map for the virtual 3D model of the human source object and the virtual 3D model of the physical target object; and
a display module for displaying, at a display site remote from the capture site, the rendering of the textured head model for the human source object directly on a surface of the physical target object by controlling movement of the avatar of the human head using the animatronics and the source position and orientation of the human user's head at the capture site, and by projecting light onto the avatar of the human head using the target position and orientation to mimic the appearance and motion of the human user's head at the capture site.

15. The system of claim 14 wherein the mapping module continuously and in real time repeatedly obtains the visual information of the human source object and controls movement of the avatar of the human user's head using the animatronics to mimic the appearance and motion of the human user's head in real time.

16. The system of claim 14 wherein the mapping module is configured to:
provide an initial mapping between coordinate data associated with features of the human source and target objects;
render the textured head model by determining the shape of the target object, morphing the initial mapping based on the determined shape of the target object, and re-mapping the morphed data set to the target object.

17. The system of claim 14 wherein the mapping module is configured to decouple the shape, pose, and/or appearance of the human source object from the shape, pose, and/or appearance of the target object.

18. The system of claim 14 wherein the display module includes a flexible or shapeable surface-based display that approximately corresponds to the shape of the physical target object.

19. The system of claim 14 wherein the display module includes one or more projectors located at various positions around the physical target object.

20. The system of claim 14 wherein the display module uses one of front projection and inside/rear projection.

21. The system of claim 14 wherein the display module includes one of a plasma display panel (PDP), a light emitting diode (LED)-based display, an organic LED (OLED) display, active matrix OLED (AMOLED) display, and a liquid crystal display (LCD).

22. The system of claim 14 wherein the display module is configured to project context-sensitive rendering of the textured head model for providing prosthetic presence where an image of an individual as the individual appeared prior to trauma is projected onto a robotic surrogate, through which the individual is enabled to interact with an environment.

23. The system of claim 14 wherein the input module is configured to capture audio information from the human source object.

24. The system of claim 14 wherein the mapping module synchronizes the presentation of the audio information with the rendering of the textured head model.

25. The system of claim 14 wherein the display module continuously displays a live video image of the rendering of the textured head model on the physical target object.

26. A non-transitory computer-readable medium comprising computer executable instructions embodied in a tangible, non-transitory computer-readable medium and when executed by a processor of a computer performs steps comprising:

obtaining, at a capture site, visual information of a human source object, wherein the human source object is a human user's head and wherein obtaining the visual information further comprises determining a source position and orientation of the human user's head;

generating, from the visual information of the human source object, a virtual 3D model of the human source object;

generating a texture map for the virtual 3D model of the human source object by projecting the visual information onto the virtual 3D model of the source object;

determining a target position and orientation of a 3D physical target object and generating a virtual 3D model of the physical target object, wherein the 3D physical target object comprises an avatar of a human head and animatronics for controlling movement of the avatar of the human head;

rendering a textured head model for the human source object from a projector perspective using the texture map for the virtual 3D model of the human source object and the virtual 3D model of the physical target object;

displaying, at a display site remote from the capture site, the rendering of the textured head model for the human source object directly on a surface of the physical target object, wherein the physical target object comprises a mannequin or an animatronic robot having at least one 3D surface that physically represents a human anatomical feature; and displaying, at a display site remote from the capture site, the rendering of the textured head model for the human source object directly on a surface of the physical target object by controlling movement of the avatar of the human head using the animatronics and the source position and orientation of the human user's head at the capture site, and by projecting light onto the avatar of the human head using the target position and orientation to mimic the appearance and motion of the human user's head at the capture site.

* * * * *